(12) United States Patent
Nakada et al.

(10) Patent No.: US 7,883,595 B2
(45) Date of Patent: *Feb. 8, 2011

(54) TIRE MANUFACTURING METHOD

(75) Inventors: Yuichi Nakada, Kodaira (JP); Yuichiro Ogawa, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 654 days.

This patent is subject to a terminal disclaimer.

(21) Appl. No.: 10/535,734

(22) PCT Filed: Nov. 25, 2003

(86) PCT No.: PCT/JP03/15035

§ 371 (c)(1),
(2), (4) Date: Nov. 3, 2005

(87) PCT Pub. No.: WO2004/048074

PCT Pub. Date: Jun. 10, 2004

(65) Prior Publication Data

US 2006/0086451 A1    Apr. 27, 2006

(30) Foreign Application Priority Data

Nov. 25, 2002   (JP)   .............................. 2002-341279

(51) Int. Cl.
*B29D 30/20*   (2006.01)
*B29D 30/32*   (2006.01)

(52) U.S. Cl. ........................ 156/111; 156/131; 156/135; 156/396; 156/403

(58) Field of Classification Search ................ 156/111, 156/117, 132, 135, 396, 397, 400–402, 131, 156/403

See application file for complete search history.

(56) References Cited

U.S. PATENT DOCUMENTS 5,882,452 A * 3/1999 Sakamoto et al. ............. 156/64

(Continued)

FOREIGN PATENT DOCUMENTS

EP    448407 A2 * 9/1991

(Continued)

OTHER PUBLICATIONS

Notification of Reasons for Refusal issued in Japanese Patent Application No. 2002-341279; mailed Mar. 16, 2010; with English-language translation.

*Primary Examiner*—Geoffrey L Knable
(74) *Attorney, Agent, or Firm*—Oliff & Berridge, PLC

(57) ABSTRACT

A tire manufacturing method includes the steps of, when a green tire is molded, moving a toroidally expandable toroidal molding drum through a distance between a plurality of working stations at a specified tact time, disposing a carcass band and both bead cores on the drum in any working station and locking the bead cores, increasing the diameter of the molding drum, toroidally extending the carcass band between both bead cores, and rolling up the side portion of the carcass band around the bead cores in the outer radial direction, assembling tire component members with the bead cores locked to the toroidal molding drum and molding the green tire, and reducing the diameter of the molding drum, unlocking the bead cores, and removing the green tire from the molding drum, whereby the tires of a plurality of sizes can be sequentially molded, a conventional tire structure must not be largely changed, and an energy and time can be prevented from being wastefully consumed.

1 Claim, 18 Drawing Sheets

U.S. PATENT DOCUMENTS

| | | |
|---|---|---|
| 6,258,189 B1 | 7/2001 | Sakamoto et al. |
| 6,475,319 B1 * | 11/2002 | Akiyama .................... 156/111 |
| 6,514,441 B1 | 2/2003 | Tanaka et al. |
| 6,616,783 B2 * | 9/2003 | Senbokuya et al. ......... 156/117 |
| 7,575,652 B2 | 8/2009 | Suda et al. |
| 2001/0002608 A1 * | 6/2001 | Okada et al. ............. 156/128.1 |
| 2002/0074077 A1 * | 6/2002 | Ikeda et al. ................. 156/123 |
| 2002/0096263 A1 | 7/2002 | Cordaillat et al. |
| 2002/0153083 A1 | 10/2002 | Takagi |
| 2003/0051794 A1 | 3/2003 | Suda et al. |
| 2005/0142238 A1 * | 6/2005 | Tsujimoto et al. ............. 425/29 |

FOREIGN PATENT DOCUMENTS

| | | | |
|---|---|---|---|
| EP | 0 492 918 A2 | | 7/1992 |
| EP | 0 997 263 A2 | | 5/2000 |
| EP | 1 055 507 A2 | | 11/2000 |
| EP | 1295704 A2 | | 3/2003 |
| JP | A-04-226742 | | 8/1992 |
| JP | A 06-64065 | | 3/1994 |
| JP | A 08-25513 | | 1/1996 |
| JP | A 2000-202924 | | 7/2000 |
| JP | A-2002-178415 | | 6/2002 |
| JP | 2002-254529 A | * | 9/2002 |
| JP | A 2002-307570 | | 10/2002 |
| JP | A 2003-80612 | | 3/2003 |
| JP | A 2003-515474 | | 5/2003 |
| WO | WO 01/32409 A1 | | 5/2001 |
| WO | WO 01/36185 A1 | | 5/2001 |
| WO | WO 01/39963 A1 | | 6/2001 |
| WO | WO 01/89818 A1 | | 11/2001 |
| WO | WO 02/055289 A1 | | 7/2002 |
| WO | WO 03/045675 A1 | | 6/2003 |

* cited by examiner (a)

(b)

(a)

(b)

(a)

(b)

(a)

(b)

(c)

(a)

(b)

(a)

(b)

(a)

(b)

TIRE MANUFACTURING METHOD

TECHNICAL FIELD

The present invention relates to a tire manufacturing method which can support high productivity of a plurality of sizes of product tires chosen from a group of sizes specified in advance, even in the case of manufacturing of different sizes of tires in tandem and particularly to a method capable of manufacture without largely changing a conventional tire structure.

BACKGROUND ART

A tire manufacturing system, particularly a molding system for molding a green tire has been increasingly sophisticated and complicated recently to respond to a request for upgrading of a tire quality and improvement of productivity, and improvement of tire manufacturing capacity while restraining an occupied space and a cost of a molding system is in demand. Therefore, instead of provision of a plurality of conventional tire molding machines for assembling various tire component members at a single place, a plurality of working stations where tire component members are assembled according to them are provided and a molding system for conveying a tire being molded between these stations at a predetermined tact time is used. But with this molding system, it is difficult to switch and assemble tire component members corresponding to plural sizes at each station within a predetermined tact time, and small-lot production can not be supported since tires in mixed different sizes can not be molded continuously, which extremely limits its practical application.

In order to solve this problem, as disclosed in the International Publication WO 01/39963, a system capable of continuous molding of a group of tires in mixed plural sizes is proposed, and this molding system comprises the steps of assembling each tire component members on a rigid core with the cross section in the toroidal shape, forming a green tire on the rigid core, vulcanizing the tire while being mounted on the rigid core and taking the cured tire out of the rigid core at the last stage.

However, this molding system has the following problems. First, structural change from the conventional tire is inevitable since members are assembled on the rigid core, and since the conventional structure in which one or more layers of carcass ply is rolled up around each bead core outward in the tire radial direction can not be used, a new tire structure so as to fix the carcass onto the bead core should be employed, but reliability of this new tire structure has not been fully established yet.

The second problem is, a rigid core used both in molding a green tire and vulcanizing the molded green tire should be held at a room temperature in the molding process but the temperature should be raised in the vulcanizing process. Therefore, energy and time for heating and cooling the rigid core is wasted.

The present invention has been made in view of the above problems and has an object to provide a tire manufacturing method in which tires in mixed plural sizes can be molded continuously by moving the tire being molded between working stations and moreover, the conventional tire structure does not have to be largely changed or energy and time can be prevented from being wastefully consumed.

DISCLOSURE OF THE INVENTION

The present invention was made to achieve the above object and its gist, construction and action will be described below.

(1) The present invention is a tire manufacturing method having a process for, in manufacturing product tires in plural sizes chosen from a group of sizes specified in advance, moving a tire being molded sequentially between stations of a molding system having a plurality of working stations, sequentially assembling tire component members specified in advance corresponding to each working station and molding a green tire at a predetermined tact time, and a process for vulcanizing the molded green tire, to be performed at one or more working stations of said molding system:

molding a green tire based on the molding sequence specified in advance, including combination of green tires in different sizes in tandem chosen as necessary from said group of sizes, disposing a carcass band and both bead cores on a toroidal molding drum whose diameter can be expanded/reduced in the toroidal shape and locking the bead cores, expanding the diameter of the molding drum, toroidally extending the carcass band between both bead cores, rolling up the side portion of the carcass band around the bead cores outward in the radial direction, assembling tire component members with the bead cores locked to the toroidal molding drum and molding the green tire, reducing the diameter of the molding drum, unlocking the bead cores, and removing the green tire from the molding drum.

According to the tire manufacturing method of the present invention, since the carcass band is rolled up around the bead cores on the toroidal molding drum whose diameter can be expanded/reduced in the toroidal shape, a tire structure with conventional high reliability can be formed, and also, since the green tire is removed from the toroidal molding drum at the end of the molding process, it is only necessary to heat the green tire in the subsequent vulcanizing process, whereby wasteful energy must not be spent. And since the green tire is molded based on the molding sequence specified in advance, including combination of green tires in different sizes in tandem chosen as necessary from said group of sizes, tires in mixed plural sizes can be continuously molded.

Moreover, in this tire manufacturing method, a green tire is molded by rolling up the side portion of the carcass band around the bead cores outward in the radial direction and then, assembling the tire component members such as a belt member, a tread member, etc. with the bead cores locked to the toroidal molding drum and molding the green tire. So, in comparison with the method of assembling these tire component members by holding a central portion in the width direction of the carcass band inflated in the toroidal shape instead of locking the bead cores to the toroidal molding drum, positioning of these tire component members to be assembled and the molding drum can be made highly accurate and by this, the accuracy of relative positions of the bead core and these tire component members can be improved, and a tire with high accuracy and excellent uniformity performance can be formed.

(2) The present invention further provides a tire manufacturing method according to item (1), wherein, in forming said carcass band, this member is assembled onto a cylindrical molding drum to form a carcass band at working stations corresponding to an inner liner member and a carcass member, respectively, and then, the carcass band is removed from the cylindrical molding drum, in molding said green tire, after said process for rolling up the side portion of the carcass member on the toroidal molding drum, the belt member, the tread member and a sidewall member are assembled at the respective corresponding working stations.

According to this aspect of the tire manufacturing method, since the belt member, the tread member and the sidewall member are assembled on the molding drum whose diameter has been expanded toroidally, deformation of these members after assembling can be minimized, and since the inner liner member and the carcass member whose influence on the quality can be ignored even if they are toroidally deformed after assembling are assembled on the cylindrical molding drum, efficient assembling can be realized, and the simple drum shape as a cylinder enables support of many sizes with a single type of drum.

(3) The present invention further provides a tire manufacturing method according to item (1) or (2), wherein at least one tire component member to be assembled at said working station is comprised of one type of member element specified in advance and common to said group of sizes, and a green tire is molded by assembling the member element by an amount specified in advance for each tire component member for all the sizes in said group.

According to this aspect of the tire manufacturing method, since the at least one tire component is comprised of one type of member element common to said group of sizes, an apparatus for manufacturing this tire component member and an apparatus for assembling thereof can be constituted extremely simply, and since many sizes can be supported by assembling the member element by an amount specified in advance, size can be switched in an extremely short time and tires in mixed plural sizes can be manufactured efficiently.

(4) The present invention further provides a tire manufacturing method according to item (3), wherein at least one of said tire component members has a rubber ribbon made of a predetermined material continuously extruded through a die with a predetermined sectional shape as said member element, this rubber ribbon is wound on a cylindrical or a toroidal molding drum in the spiral shape and this is laminated in the predetermined sectional shape, and this tire component member is assembled.

According to this aspect of the tire manufacturing method, since one type of continuous rubber ribbon is wound in the spiral shape and laminated, a tire component member in the different sectional shape can be assembled according to the tire size only by changing the way to laminate the rubber ribbon, and the size can be switched in a short time.

(5) The present invention further provides a tire manufacturing method according to item (3) or (4), wherein at least one of said tire component members has a continuous sheet with a predetermined width made of a predetermined material as said member element, this continuous sheet is cut into the length specified in advance per size, narrow pieces in the number predetermined for each size are joined to each other so that the cut-off faces of the cut-off narrow pieces are aligned in the circumferential direction on the molding drum, and this tire component member is assembled.

According to this aspect of the tire manufacturing method, the continuous sheet is cut into the length specified in advance per size and narrow pieces are disposed on the molding drum so as to assemble this tire component member. So, by choosing the width of the continuous sheet so that members for a single tire can be formed if the integral number of narrow pieces are aligned for any tire size, tire component members with different width or circumferential length depending on the tire size can be assembled only by changing the cutting length or the number of pieces, and size switching can be performed in a short time.

(6) The present invention further provides a tire manufacturing method according to item (3), wherein a tread member and a sidewall member are included in tire component members having the rubber ribbon in (4) as said member element, and an inner liner member, a carcass member and a belt member are included in tire component members having the continuous sheet with a predetermined width in (5) as said member element.

According to this aspect of the tire manufacturing method, since essential members are assembled in the above-mentioned method, switching of many sizes can be performed in a short time.

(7) The present invention further provides a tire manufacturing method according to any one of items (3) to (6), wherein, as for at least one tire component member, said member element is directly assembled onto a cylindrical or a toroidal molding drum.

According to this aspect of the tire manufacturing method, since said member element is assembled directly onto the molding drum without a stock, a space for storing intermediate materials of this member can be saved, and also, size change immediately before can be supported, whereby more flexible manufacturing is realized.

(8) The present invention further provides a tire manufacturing method according to any one of items (3) to (6), wherein, as for at least one tire component member, said member element for a single tire is combined and then, the combined member element is assembled on a cylindrical or a toroidal molding drum.

According to this aspect of the tire manufacturing method, by forming and preparing said member element for a single tire in advance, a time for assembling onto the molding drum can be reduced, and if the assembling time is a bottleneck in reducing a tact time, when this is directly assembled to the molding drum, the time can be reduced.

(9) The present invention further provides a tire manufacturing method according to any one of items (1) to (8), wherein among idle time at each of the working stations corresponding to each tact determined based on said molding sequence specified in advance, a tact time is changed for the respective tact so that the shortest idle time becomes shorter.

According to this aspect of the tire manufacturing method, since the tact time can be changed for the respective tact depending on the combination of tire sizes during molding as above so that the time becomes the shortest, the average number of molded tires per time can be increased.

(10) The present invention further provides a tire manufacturing method according to any one of items (1) to (9), wherein an estimate equation is prepared in advance to estimate a primary harmonic component of radial run-out in a green tire caused by a relative displacement or angular displacement between the center of axis of the carcass band and the center of axis of the bead core in setting the bead core on the outer circumference of the carcass band, radial run-out of the green tire is measured for one cycle and an inverted waveform in which the primary harmonic component is inverted is obtained, in molding a tire of the same size in said molding system thereafter, a relative displacement or an angular displacement between the center of axis of the carcass member and the center of axis of the bead core causing this inverted waveform is obtained by back calculation of said estimate equation, and the position or the angle of at least either one of the bead core axis centers is changed by the magnitude of the displacement acquired from this estimate equation in the direction of the displacement acquired from this estimate equation so as to set the bead core on the carcass band.

It is known that the circumferential phase and the amount of relative displacement or angular displacement between the center of axis of the carcass band and the center of axis of the bead core has a strong correlation with the amplitude of the primary harmonic component of the radial run-out of the green tire, and it is also known that there is a strong correlation between the radial run-out of the green tire and RFV of the product tire.

According to this aspect of the tire manufacturing method, the molding system can be constructed so that the setting position or angle of the bead core can be controlled, the radial run-out of the green tire is measured for one cycle, the measurement result is used and the setting position or angle of the bead core is controlled with respect to the green tire to be molded after that so as to reduce the radial run-out of the green tire, whereby RFV of the product tire can be lowered and the uniformity can be improved.

(11) The present invention further provides a tire manufacturing method according to any one of items (1) to (10), wherein vulcanization of the molded green tires is started sequentially at said predetermined tact time and vulcanization of these tires is finished at said predetermined tact time.

According to this aspect of the tire manufacturing method, since vulcanization of the tire is started and finished in synchronization with molding of the green tire, an intermediate stock between the tire molding system and the tire vulcanization system and the intermediate stock within the tire vulcanization system can be minimized.

(12) The present invention further provides a tire manufacturing method according to any one of items (1) to (11), wherein inspection of the vulcanized tire is started at said predetermined tact time.

According to this aspect of the tire manufacturing method, since the inspection of tire is conducted in synchronization with tire vulcanization, an intermediate stock between the tire vulcanization system and the tire inspection system can be saved.

BEST MODE FOR CARRYING-OUT OF THE INVENTION

A preferred embodiment of the present invention will be described below based on FIGS. 1 to 18.

Figure 1:
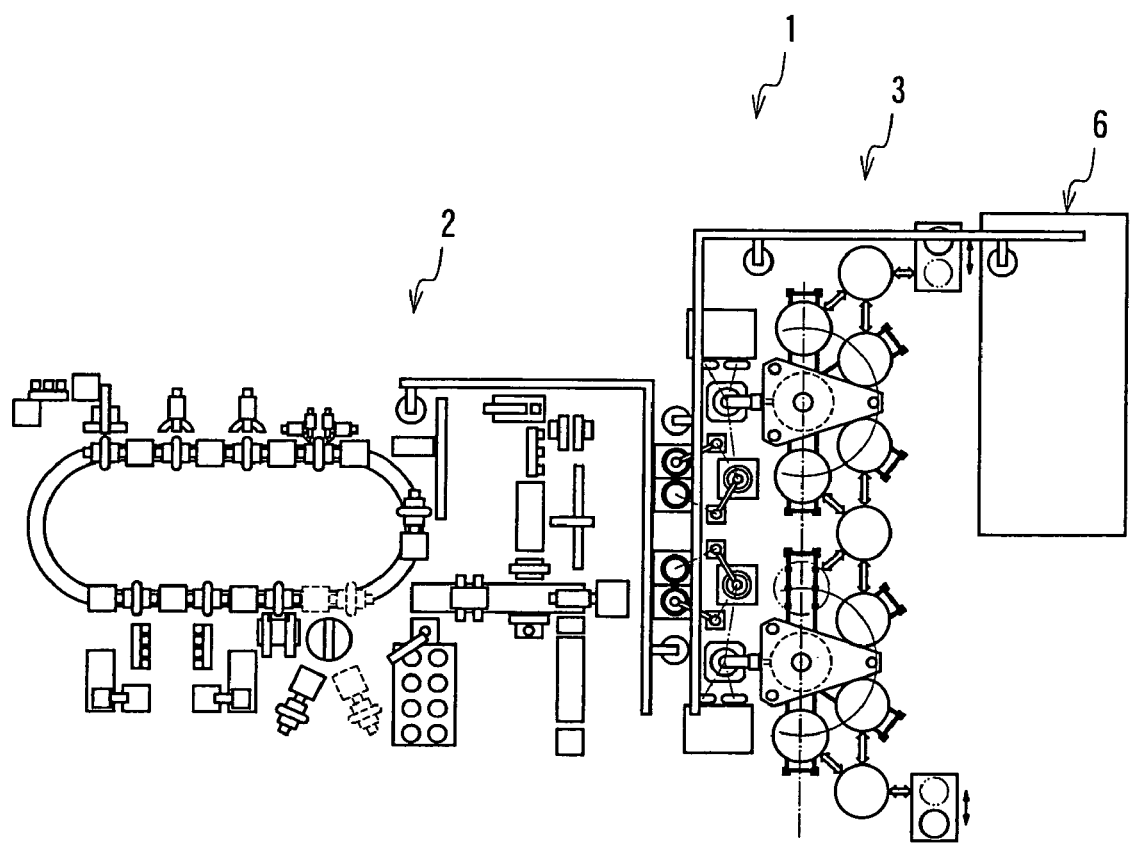
FIG. 1 is an arrangement plan showing a tire manufacturing system according to a preferred embodiment of the present invention.
Figure 2:
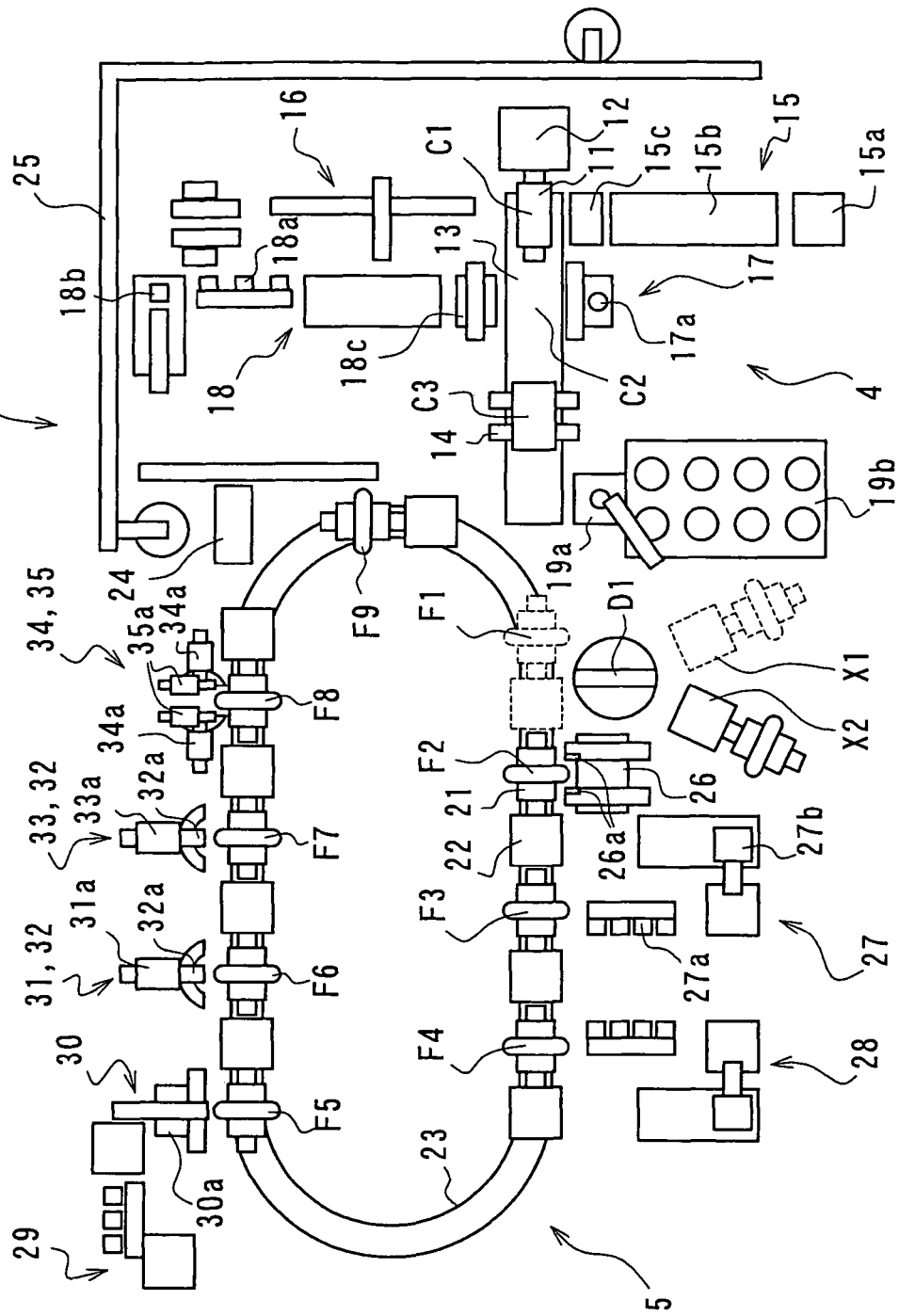
FIG. 2 is an arrangement plan showing a tire molding system.
Figure 3:
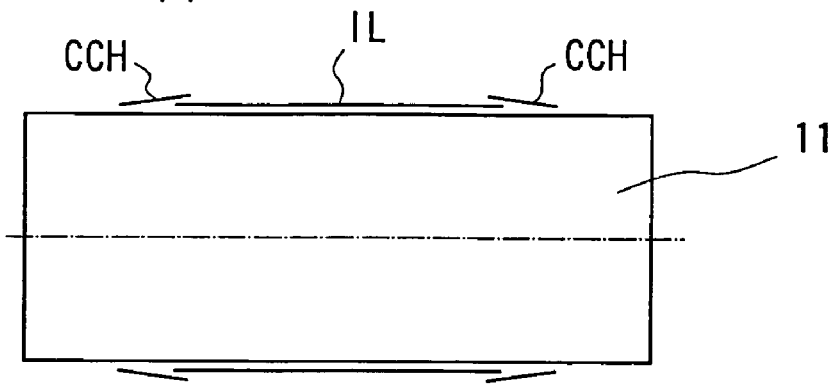
FIG. 3 is a sectional view showing a tire being molded.
Figure 3:
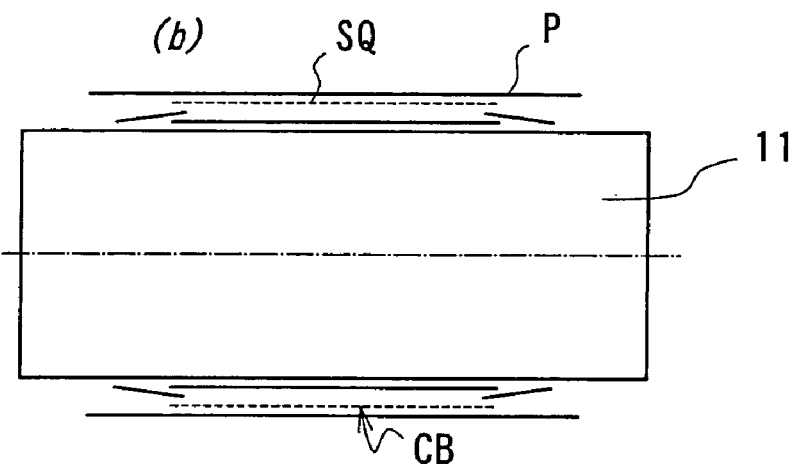
Figure 3:
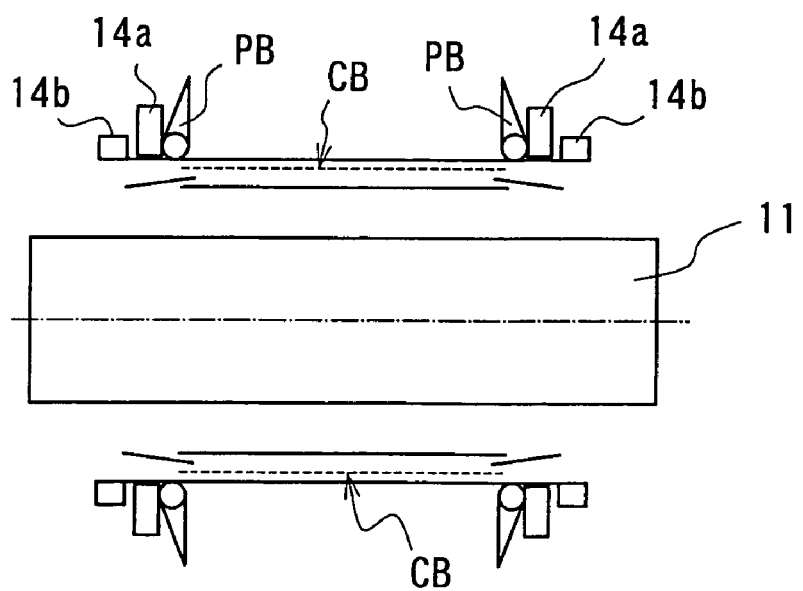
Figure 4:
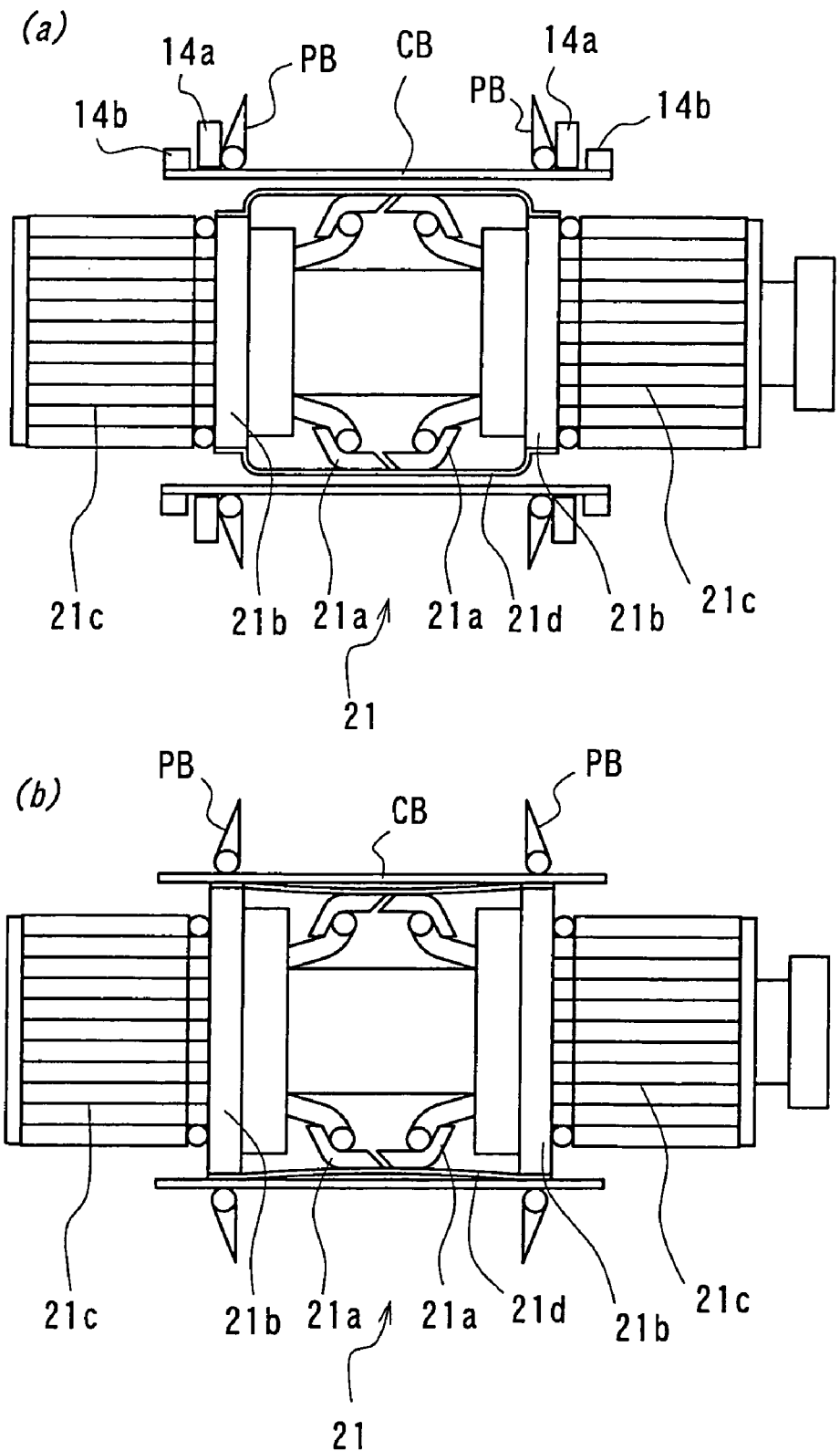
FIG. 4 is a sectional view showing a tire being molded.
Figure 5:
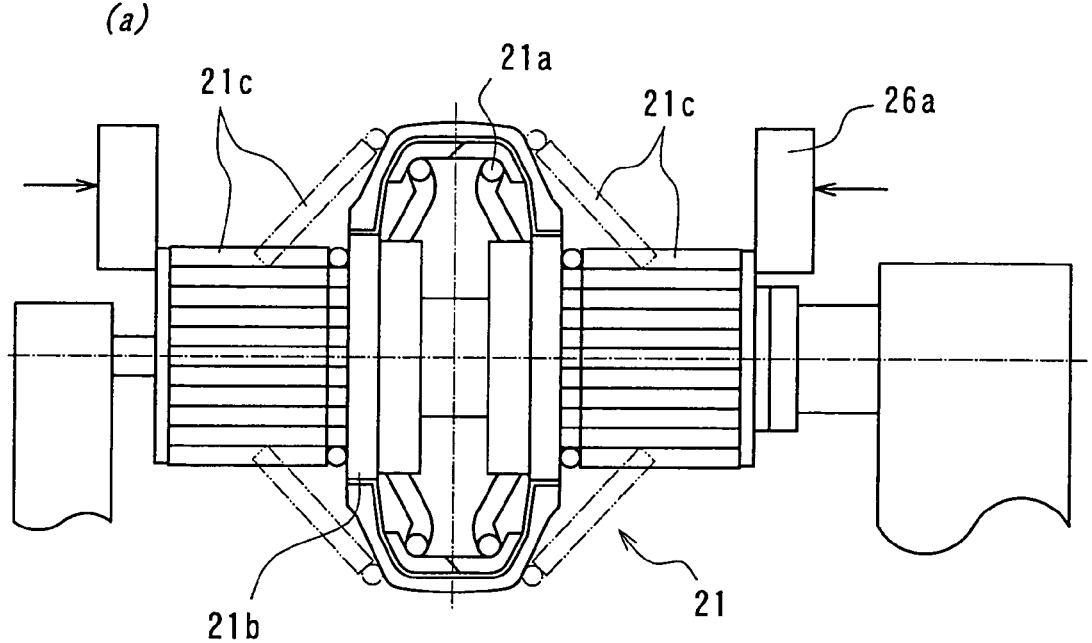
FIG. 5 is a sectional view showing a tire being molded.
Figure 5:
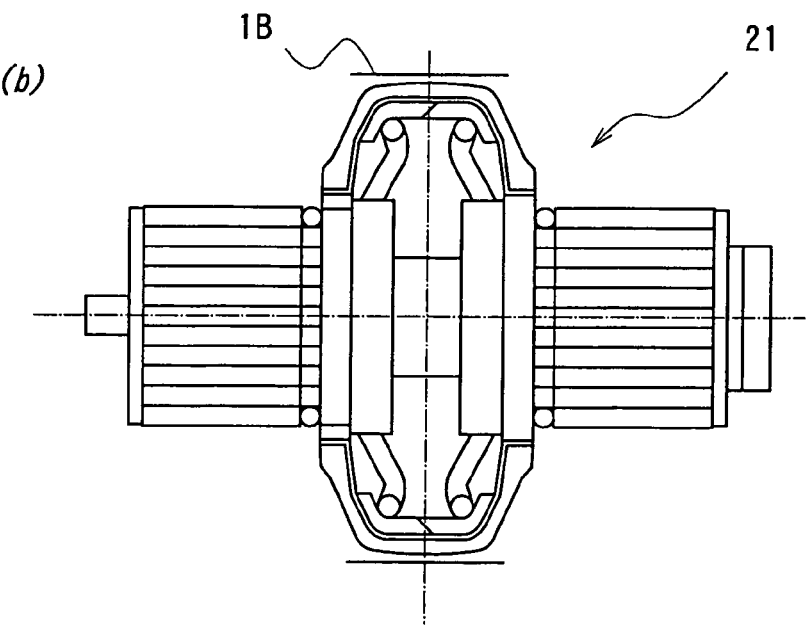
Figure 6:
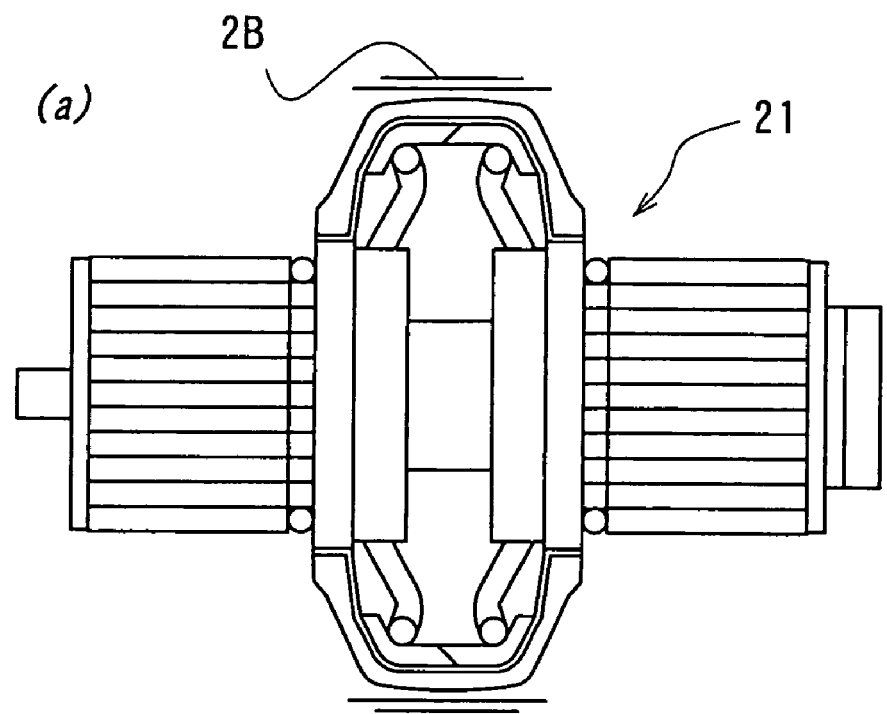
FIG. 6 is a sectional view showing a tire being molded.
Figure 6:
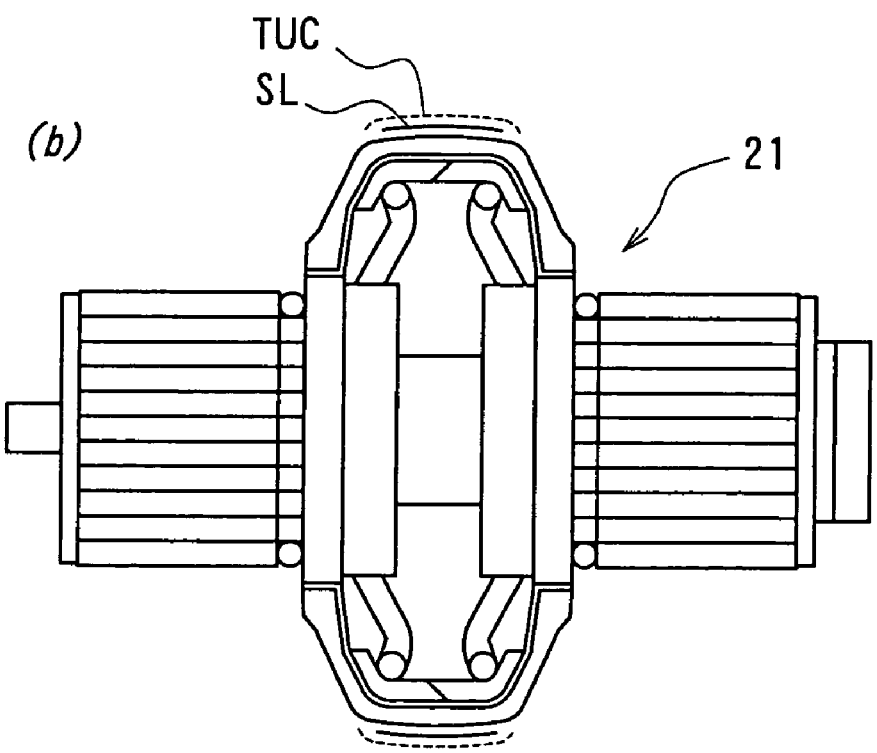
Figure 7:
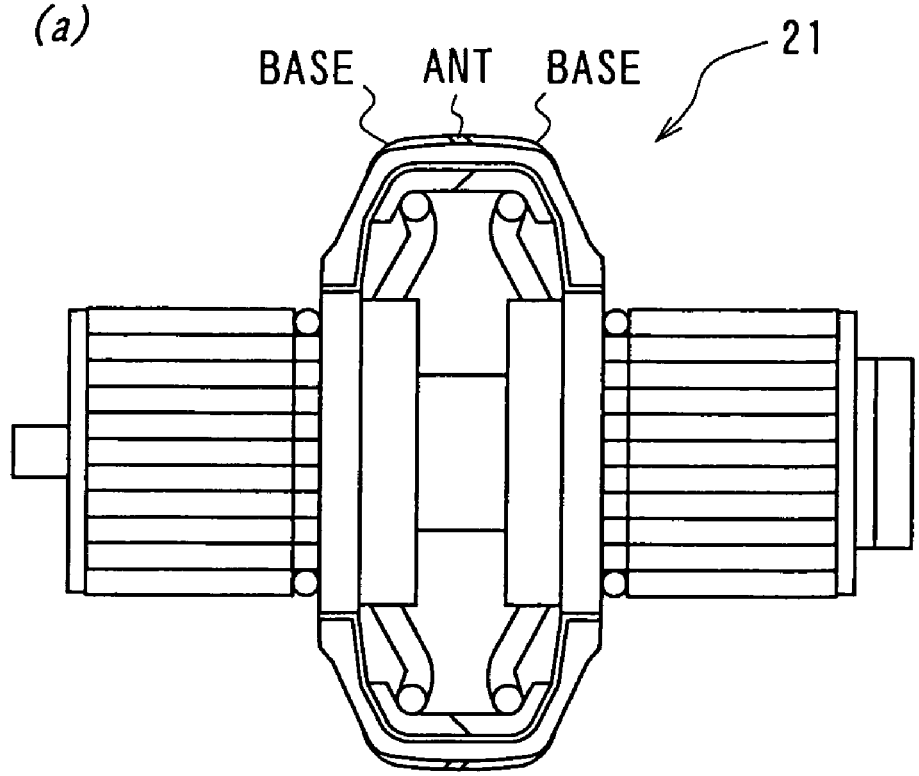
FIG. 7 is a sectional view showing a tire being molded.
Figure 7:
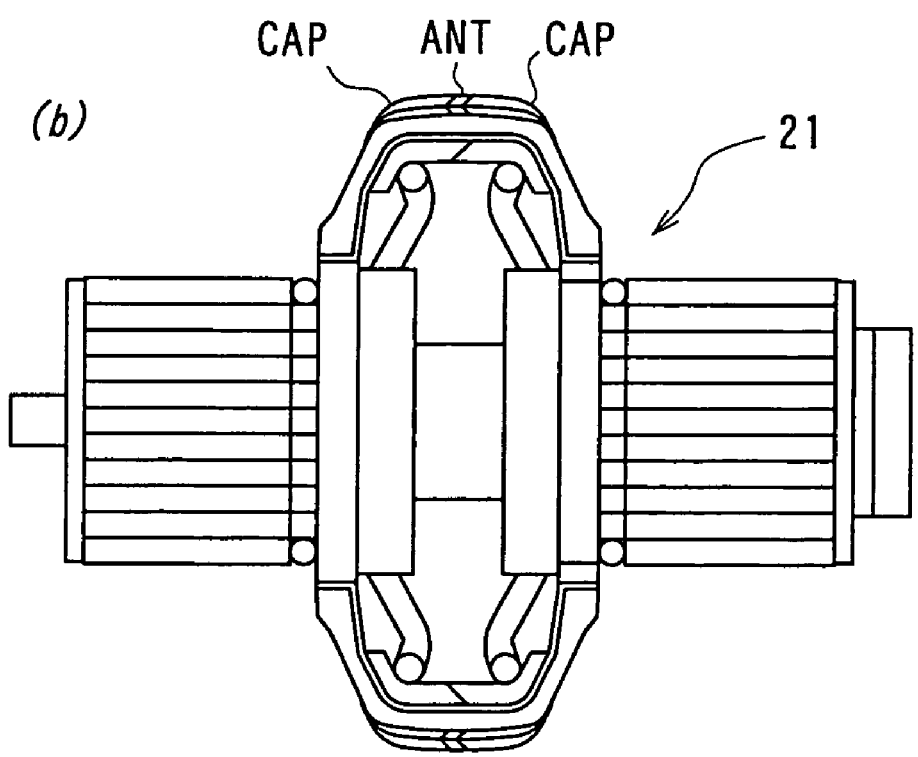
Figure 8:
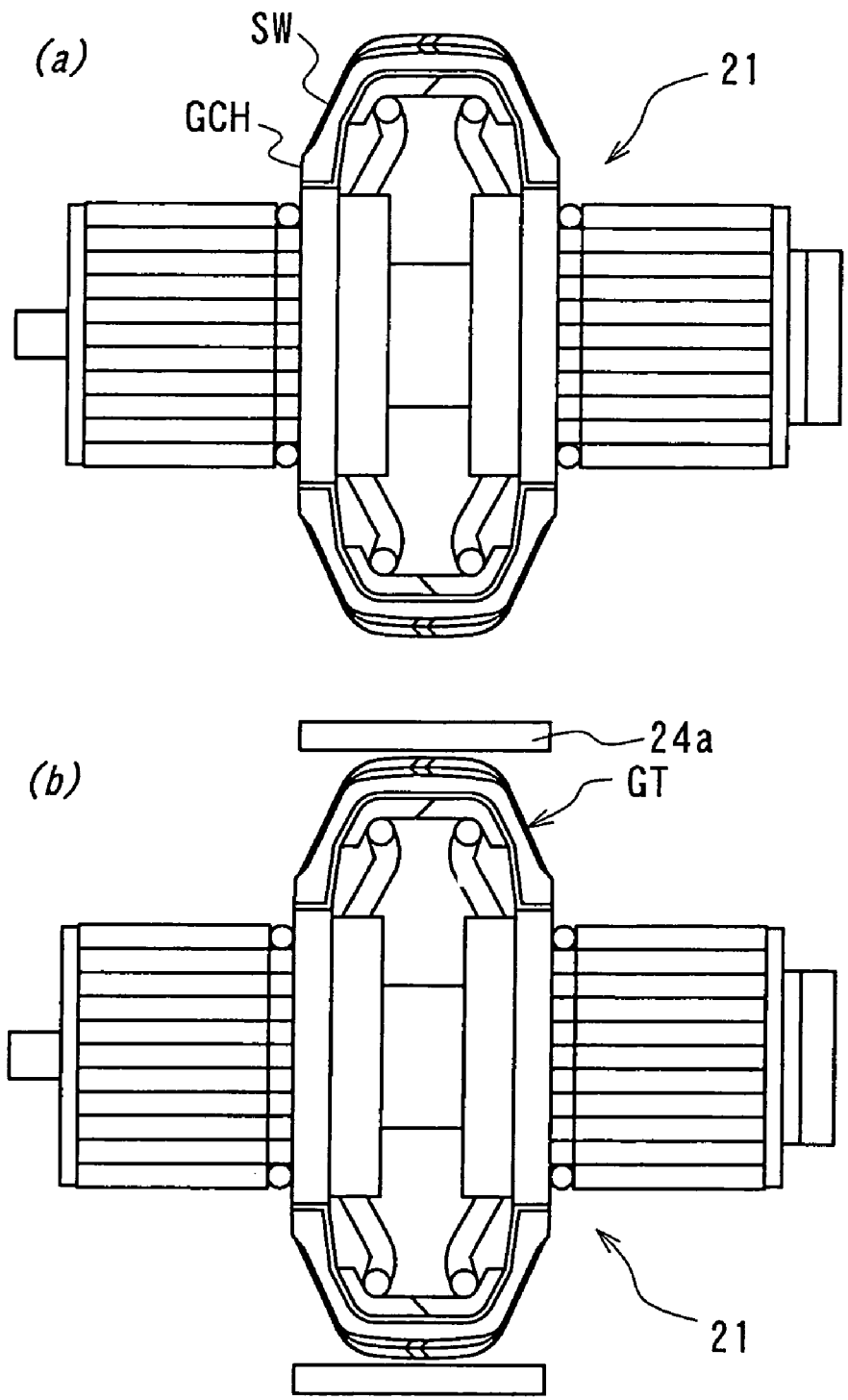
FIG. 8 is a sectional view showing a tire being molded.

FIG. 1 is an arrangement plan of a tire manufacturing system 1 used for a tire manufacturing system of this preferred embodiment, and the tire manufacturing system 1 is provided with a tire molding system 2, a tire vulcanization system 3 and a tire inspection system 6, and in the first, the tire molding system 2 and a method for molding a green tire will be described based on the arrangement plan of the tire molding system 2 shown in FIG. 2.

The tire molding system 2 is comprised of a first molding unit 4 and a second molding unit 5 arranged adjacent to each other, and the first molding unit 4 is provided with three working stations C1, C2 and C3, a first molding carriage 12 supporting a cylindrical molding drum 11 in the cantilever manner and rotating it around the spindle, a transfer carriage 14, and a straight track 13 for guiding movement of the first molding carriage 12 among the working stations C1, C2 and C3.

The second molding unit 5 is provided with 9 working stations F1 to F9, a second molding carriage 22 for supporting a toroidal molding drum 21 in the cantilever manner and rotating it around the spindle, an endless track 23 for guiding movement of the second molding carriage 22 among the working stations F1 to F9, a green tire transfer carriage 24, and a green tire conveyer 25 for conveying the green tire to the vulcanization system.

The first molding carriage 12 on which the cylindrical molding drum 11 is loaded repeats movement from the working station C1 to C2, C2 to C3 and C3 to C1 in this order at a predetermined tact time, while the transfer carriage 14 repeats reciprocation between the working station C3 and F1. Also, the second molding carriage 22 on which the toroidal molding drum 21 is loaded repeats clockwise movement to each working station such as from the working station F1 to F2 at a predetermined tact time. In the tire molding system 2 of the preferred embodiment shown in the FIG., one unit of the first molding carriage 12 and eight units of the second molding carriages are provided, each of the carriages 12 and 22 being moved by a driving device, not shown, between the working stations, and after being stopped at each of the working stations, they are positioned by a positioning device provided at each of the working stations with high accuracy.

FIGS. 3 to 8 are radial sectional views, showing a tire being molded using this molding system 2 per. step, including a central axis of the drum. First, at the working station C1, using an inner liner member assembling device 15 and a canvas chafer member assembling device 16, each of an inner liner member IL and a canvas chafer member CCH to be arranged on its outer circumference in the radial direction are assembled onto the cylindrical molding drum 11, as shown in FIG. 3(a), and then, the cylindrical molding drum 11 is moved to the working station C2, where, using a squeegee member assembling device 17 and a carcass member assembling device 18, as shown in FIG. 3(b), one or two layers of squeegee member SQ and one or two layers of carcass member P are assembled outside the inner liner member IL and the canvas chafer member CCH in the radial direction so as to form a carcass band CB.

FIG. 3(b) shows an example in which the squeegee member SQ and the carcass member P are provided in one layer, respectively, but when they are provided in two layers, they are assembled in the order from the inner-layer side squeegee member SQ, the inner-layer side carcass member P, the outer-layer side squeegee member SQ and the outer-layer side carcass member P. The cylindrical molding drum 11 is constructed and arranged capable of expanding/reducing the diameter of each of a plurality of segments formed by being divided in the circumferential direction, and a tire component member is arranged on the circumference of the cylindrical molding drum 11 in the diameter expanded state.

In the meantime, at the working station C3, a pair of preset beads PB in each of which a bead filler is preset on the bead core is set on the transfer carriage 14. And as shown in FIG. 3(c), the carcass band CB is arranged inside the pair of preset beads PB having been set in the radial direction. That is, the transfer carriage 14 is provided with a bead holding ring 14a capable of diameter expansion/reduction for holding each of the preset beads PB from their side faces and a band holding ring 14b capable of diameter expansion/reduction for holding the carcass band CB from outside in the radial direction, and at the working station C3, the preset bead PB is taken out of a bead stock 19b using a bead handling robot 19a, and after this is transferred to the bead holding ring 14a and held by the bead holding ring 14a, the transfer carriage 14 is made to stand by in this state, and then, the cylindrical molding drum 11 with the carcass band CB assembled is inserted inside the pair of present beads PB having been set in the radial direction up to a predetermined position in the axial direction. After the diameter of the band holding ring 14b is reduced so that the carcass band CB is held from outside in the radial direction, the diameter of cylindrical molding drum 11 is reduced and the carcass band CB is transferred from the cylindrical molding drum 11 to the transfer carriage 14, as shown in FIG. 3(c).

In the above, the preset bead PB on which the bead filler and the bead core are preset in advance is set on the transfer carriage 14, but instead, it may be so constituted that at the working station C3, only the bead core is set on the transfer carriage 14 and the bead filler is assembled at the working station F2, which will be described in detail later, or at another exclusive working station which is to be added.

Next, the transfer carriage 14 holding the preset beads PB and the carcass band CB is moved to the working station F1 where the toroidal molding drum 21 is on standby, as shown in FIG. 4(a), and both the preset beads PB and the carcass band CB are transferred onto the toroidal molding drum 21, as shown in FIG. 4(b).

This step is described in detail as follows. The toroidal molding drum 21 is provided with a right and left pair of core bodies 21a comprised of a plurality of rigid segments adjacent to each other in the circumferential direction and capable of expansion/contraction displacement, a right and left pair of bead lock portions 21b similarly adjacent to each other in the circumferential direction and comprised of rigid segments capable of expansion/contraction displacement, carcass rolling-up rods 21c provided at right and left ends in the axial direction and arranged in plural in the circumferential direction, and a center bladder 21d arranged outside of the core body 21a in the radial direction and made of a flexible material inflating toroidally by supply of internal pressure, and it is so constituted that the core body 21a, the bead lock portion 21b and the carcass rolling-up rod 21c on the same right or left side is provided on a right or left slider so that these 21a, 21b and 21c can be integrally displaced in and outside in the axial direction. And with the present bead PB being held by the bead holding ring 14a and the carcass band CB by the band holding ring 14b, the transfer carriage 14 is moved to the station F1 and they are arranged outside the toroidal molding drum 21 standing by in the state where the bead lock portion 21b is brought close to the shaft end to reduce the diameter, the diameter of the bead lock portion 21b is expanded and the preset bead PB is fixed onto the toroidal molding drum 21. And then, the diameters of the bead holding ring 14a and the band holding ring 14b are expanded to release their constraint, and the transfer carriage 14 is returned to the working station C3. In this way, the present beads PB and the carcass band CB can be transferred onto the toroidal molding drum 21.

Next, the toroidal molding drum 21 is moved to the working station F2, where, as shown in FIG. 5(a), the center part of the carcass band CB in the width direction is inflated in the toroidal shape and then, the side of the carcass member P is rolled up outside in the radial direction. This process is carried out as follows. While an internal pressure is applied to the center bladder 21d to inflate and deform it, the sliders on both sides with the bead lock portions 21b and so on mounted are moved toward the center in the axial direction, and at the same time, the diameters of the right and left core bodies 21a are also expanded so that the center part in the width direction of the carcass band CB is inflated and deformed in the toroidal shape, and in the middle of this inflation/deformation, a claw 26a provided at an external driving device 26 and engaged with the rear end of the carcass rolling-up rod 21c is moved toward the center in the axial direction so as to advance and displace the carcass rolling-up rod 21c in the same direction so that the tip end of the rolling-up rod 21c is displaced by a link mechanism, not shown, along the side face of the core body 21a whose diameter was partially expanded and the side portion of the carcass member P can be rolled up around the preset beads PB. After that, the diameter of the core body 21a is expanded to the maximum to fulfill the function to support the tire component members to be subsequently assembled and hence, their assembling external force from inside in the radial direction, by which assembling accuracy of each member can be improved.

Or, at this working station F2, for example, waveform of the radial run-out of the carcass band inflated and deformed in the toroidal shape can be measured for one cycle. Here, the waveform of the radial run-out of the carcass band CB inflated and deformed in the toroidal shape refers to the waveform of change in the circumferential direction of the radius distance from the center of axis of rotation of the molding drum at the center in the axial direction of the inflated carcass band. And the phase f of its primary harmonic component and the amplitude Y is fed back to the process at the working stations C3 and F1 mentioned above. That is, one of both bead holding rings 14a of the transfer carriage 14 standing by at the working station C3 is constituted so that its orientation of the center of axis is controlled without stages in a predetermined direction, within a horizontal plane, for example, and as a first operation, at the working station C3, after the preset beads PB are set on the bead holding ring 14a, the center of axis of the bead holding ring 14a is inclined by an angle a determined uniquely from the amplitude Y measured at the working station F2. Here, the angle a means an angle required to cancel the amplitude Y.

Next, as the second operation, at the working station F1, the molding drum 21 set at the standard position in the circumferential direction is rotated by the phase f measured at the working station F2 prior to the bead lock. By these first and second operations, information of the primary harmonic component of the radial run-out of the carcass band CB inflated and deformed in the toroidal shape is fed back to the tire to be molded after measurement of the radial run-out waveform so that the above radial run-out can be improved by canceling the primary harmonic component of the radial run-out, whereby the RVF level of the product tire having correlation with the radial run-out can be improved.

In the above, the bladder 21d is provided at the molding drum 21, and the carcass band CB is inflated and deformed by supplying an internal pressure into this bladder 21d, but the carcass band CB can be also inflated and deformed without using the bladder 21d. In that case, this is accomplished by placing a rubber seal for sealing the internal pressure on the outer circumferential face of the bead lock portion 21b and supplying the internal pressure supplied into a space enclosed by the bead lock portion 21b and the carcass band CB.

After that, the molding drum 21 is sequentially moved to the working stations F3 to F8, and the following operations are to be performed. At the working station F3, using an inner-layer belt member assembling device 27, an inner-layer belt member 1B is assembled with the core body 21a with the expanded diameter as the base, as shown in FIG. 5(b), and then, at the working station F4, using an outer-layer belt member assembling device 28, an outer-layer belt member 2B is assembled, as shown in FIG. 6(a).

At the working station F5, using a spiral layer member assembling device 29 and a tread under-cushion member assembling device 30, a spiral layer member SL is assembled, as shown in FIG. 6(b), and outside the spiral layer member SL in the radial direction, a tread under-cushion member TUC is assembled.

At the working station F6, using a base tread member assembling device 31 and an antenna member assembling member 32, a base tread member BASE arranged on both sides of the tire in the axial direction and a highly conductive antenna member ATN arranged adjacent to these members at the center part of the tire in the axial direction are assembled, as shown in FIG. 7(a), and then, at the working station F7, using a cap tread member assembling device 33 and an antenna member assembling device 32, a cap tread member CAP arranged on both sides of the tire in the axial direction and a highly conductive antenna member ATN arranged adjacent to these members at the center part of the tire in the axial direction are assembled, as shown in FIG. 7(b).

At the working station F8, on both side faces of the tire being molded, a sidewall member SW is assembled using a sidewall member assembling device 34, as shown in FIG. 8(a), and then, inside it in the radial direction, a rubber chafer member GCH is assembled using a rubber chafer member assembling device 35.

As mentioned above, since the molding drum 21 is provided with the bead lock portion 21b, the shaping bladder 21d and the core body 21a capable of expansion/contraction displacement, operations from extension of the carcass band CB into the toroidal shape to assembling of the belt member and the tread member can be accomplished with the tire being molded bead-locked on this drum 21, and tire qualities such as uniformity can be improved as compared with the conventional molding method in which the bead lock of the tire being molded should be released and transferred between the working stations between these operations.

At the last working station F9, after the operation such as application of a barcode, the finished green tire GT is removed from the molding drum 21 and transferred to the green tire transfer carriage 24. The green tire transfer carriage 24 is provided with a holding ring 24a capable of expansion and contraction for holding the green tire GT from outside in the radial direction, and in transferring the green tire GT from the molding drum 21 to the transfer carriage 24, the transfer carriage 24 in the state where the diameter of the holding ring 24a is expanded is moved to the working station F9 where the molding drum 21 is standing by. And after the diameter of the holding ring is reduced so as to hold the outer circumference of the finished green tire GT, the diameter of the molding drum 21 is reduced so that the green tire transfer carriage 24 holding the green tire GT is made to leave the working station F9. After that, the green tire GT is transferred from the green tire transfer carriage 24 to the green tire conveyer 25, and this is conveyed to the tire vulcanization system 3. In the meantime, the second molding carriage 22 is further rotated clockwise on an endless track 23, and the molding drum 21 is moved to the working station F1.

The above explanation was made for the tire of the size to which all the tire component members prepared at this tire molding system 2 can be assembled and formed, but for the tire of the size which does not use a part of the tire component members, the corresponding operations are merely skipped.

Also, the tire component members to be assembled at the molding system 2 are not limited to the above but addition/omission is possible as appropriate according to a group of sizes to be handled by the molding system 2. Moreover, the arrangements including the tracks 13 and 23 are not limited to the above, either, but can be chosen as appropriate according to the manufacturing conditions, space restriction, etc. In the example shown in FIG. 2, for example, the working stations F1 to F8 are provided on both straight portions parallel with each other constituting the track 23, but they can be provided only one of the straight portions, which makes the layout narrow and long in this case.

Moreover, in this tire manufacturing method, among the idle time of each working station corresponding to each tact determined based on the molding sequence specified in advance, the tact time can be changed for each tact so that the shortest idle time becomes shorter, by which the number of tires molded per unit time can be increased and the productivity can be improved.

The size of tires assembled at each working station is changed at each tact, that is, each moment ticking by tact time, but time required for assembling actual tire component members at each working station can be known in advance for processes per size, and therefore, the idle time obtained by subtracting an actual required time from the tact time corresponding to each tact can be known for each working station, and the idle time at the working station with the shortest idle time, that is, the shortest idle time can also be known.

If the tact time is constant regardless of tact, the shortest idle time is changed according to the size in each tact corresponding to each working station determined based on the molding sequence specified in advance, but since the shortest idle time at each tact can be known as above, the tact time can be changed in advance so that the shortest idle time becomes shorter or preferably zero, by which the shortest idle time can be reduced and the productivity can be improved.

In the conventional tire molding system, it was not possible to mold mixture of green tires in different sizes in a predetermined tact time since a lot of time is required to switch the size of each of the tire component members and complicated molding drum. In the molding system 1 of this preferred embodiment, green tires of optional two different sizes chosen from a group of sizes specified in advance can be molded continuously at a predetermined tact time, the point of which will be described below.

A method for enabling such a tire molding process for mixture of different sizes is to constitute the tire component members by one type of member element determined in advance and common to the group of sizes to be molded by this molding system 2 and to mold a green tire by assembling a predetermined amount of the member element for each of the tire component members for all the sizes in the above group.

A first assembling method of the tire component members for the mixed molding of different sizes employs a rubber ribbon as the above member element, in which the rubber ribbon of a predetermined material extruded continuously through a die with a predetermined sectional shape is wound spirally on a cylindrical or a toroidal molding drum, and this is laminated in a predetermined sectional shape so as to assemble this tire component member. For simplification, this method is referred to as "ribbon lamination method" in this specification.

Figure 9:
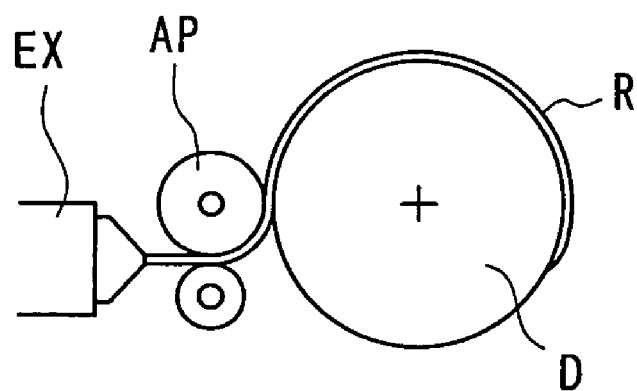
FIG. 9 is an explanatory view showing a ribbon laminating method.
Figure 9:
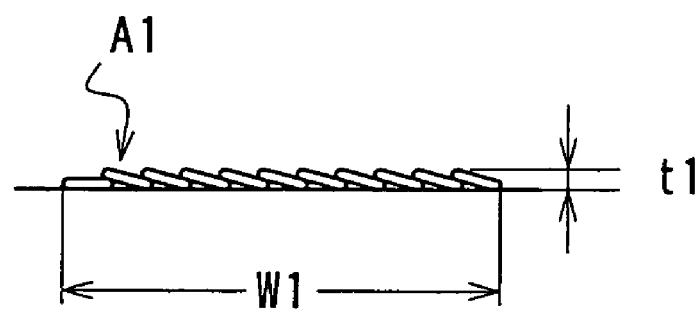
Figure 9:
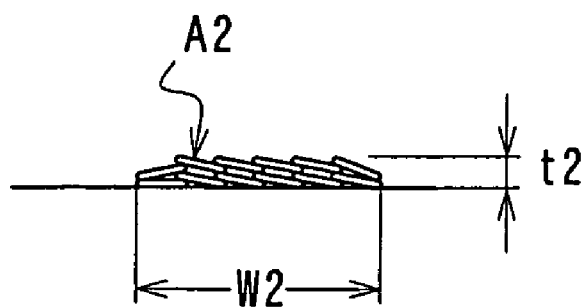

FIG. 9 is a diagram explaining this method, and this ribbon lamination method is, as shown schematically in the side view in FIG. 9(*a*), a method in which a rubber ribbon R is continuously extruded from an extruder EX having a die with a predetermined section, this ribbon R is held by a ribbon applying device AP while a body of rotation D is rotated, and the rubber ribbon R is laminated in the spiral state on the circumference of the body of rotation D while controlling the position and angle so that a laminated body with a required section is formed. As in FIGS. 9(*b*) and (*c*) showing the laminated body in sectional views, according to this method, since using the rubber ribbon R in the same sectional shape, both a wide and thin laminated body A1 with the width of W1 and the thickness of t1 and a narrow and thick laminated body A2 with the width of W2 and the thickness of t2 can be formed, assembling of tire component members corresponding to different sizes can be accomplished without requiring time for switching by programming behaviors of the ribbon applying device AP corresponding to each of the sizes in the group in advance and choosing a program to be executed according to the size.

A second assembling method of the tire component members for the mixed molding of different sizes is a method in which a continuous sheet with a predetermined width made of a predetermined material is cut off to a predetermined length for each size, the predetermined number of the cut-off narrow pieces are joined together for each size so that the cut-off faces of the narrow pieces are aligned in the circumferential direction on the molding drum. For simplification, this method is referred to as "predetermined-width narrow-piece method" in this specification.

Figure 10:
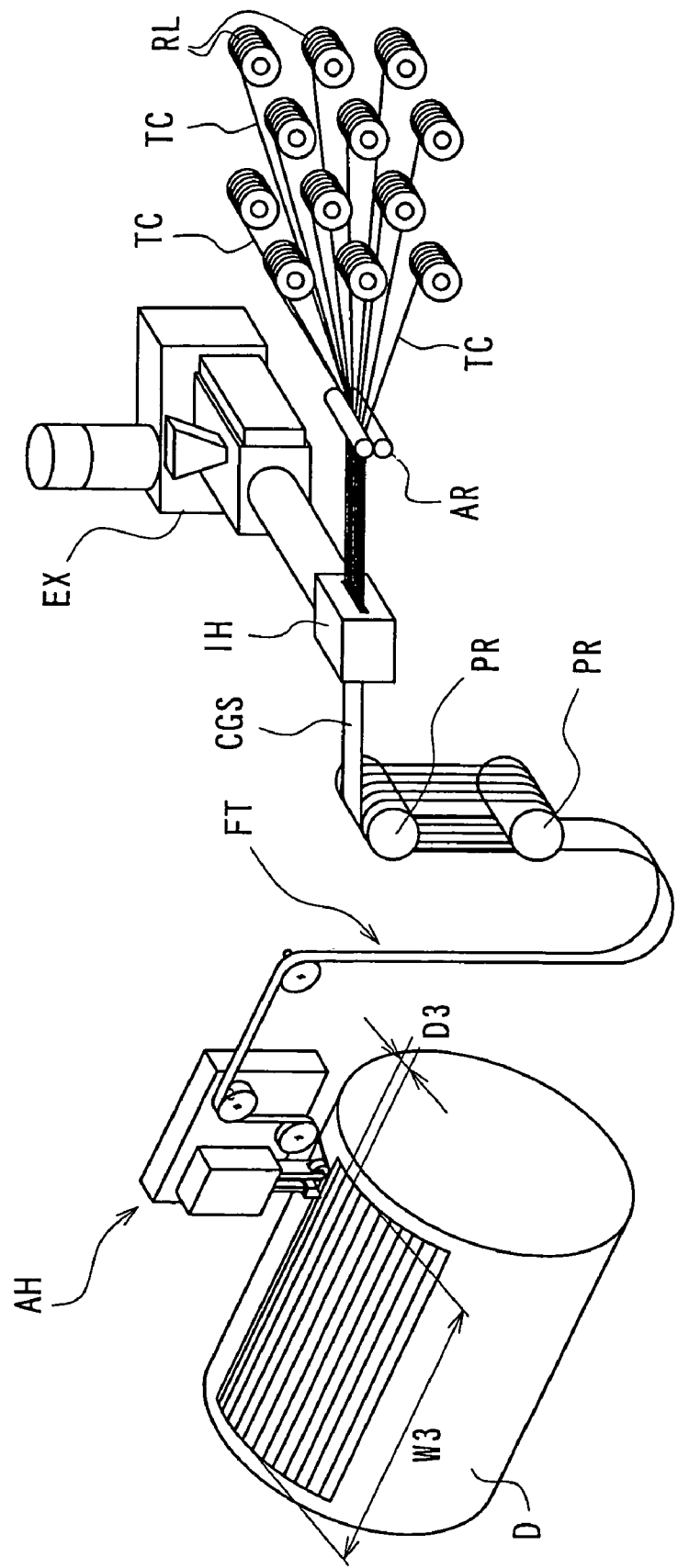
FIG. 10 is an explanatory view showing a predetermined-width narrow-piece method.

FIG. 10 is a diagram explaining this method referring to a rubber member with cord, and in this predetermined-width narrow-piece method, surface-treated cords TC are reeled out of a plurality of reels RL and aligned through an alignment roller AR, they are passed through an insulation head IH, where they are passed through the rubber extruded from the extruder EX so that the cord TC is covered by rubber to have a rubber strip CGS with cord of a predetermined width, and this strip CGS is passed through a pull roller PR and a festoon FT and guided to an applying head AH. By this applying head AH, this strip CGS is disposed on the body of rotation D in parallel or at an inclined angle with respect to the axis of the body of rotation D and then, the strip CGS is cut off to the cutting length corresponding to a width W3 of this tire component member on the body of rotation D and next, the body of rotation D is rotated by an angle corresponding to the circumferential length of the dimension obtained by subtracting a joint margin from the width of this strip CGS along the body of rotation in the circumferential direction, and the above operation of the applying head AH is repeated by the number of times determined according to this size so that this rubber member with cord is assembled for one cycle of the tire.

According to this method, by setting the dimension of the strip width D3 less the joint margin to the common divisor of the circumferential length corresponding to all the sizes of the above group to be handled of this tire component member, all of these sizes can be supported only by changing the cutting length W3 and the number of pieces to be applied according to the size, by which assembling of tire component members corresponding to different sizes can be accomplished without requiring time for switching by programming movement strokes and the number of movement times of the applying head AH corresponding to each of the sizes in the group in advance and choosing a program to be executed according to the size.

In this tire molding system 2, among the above mentioned tire component members, the squeegee member SQ, the tread under-cushion member TUC, the base tread member BASE, the cap tread member CAP, the antenna member ATN, the sidewall member SW and the rubber chafer member GCH can be assembled by the above-mentioned ribbon lamination method. And each of assembling devices corresponding to these members is provided with extruders 17*a*, 30*a*, 31*a*, 33*a*, 32*a*, 34*a* and 35*a*, respectively, in the order of these members.

Also, the inner liner member IL, the inner- and outer-layer carcass member P and the inner- and outer-layer belt members 1B and 2B can be assembled by the above predetermined-width narrow-piece method. In assembling the inner liner member IL, a simple rubber sheet of a constant width is extruded from an extruder 15*a* as a strip used for this, instead of the rubber strip with cord in FIG. 10, and this is cut off on the conveyer 15*b* to the length corresponding to the tire size to be handled. The cut-off narrow pieces are joined sequentially on a transfer drum 15*c* to form a sheet for a single tire and then, after the transfer drum is turned pivotally circumscribing the cylindrical molding drum 11, these drums 11 and 15*c* are rotated in synchronization, and this sheet is transferred onto the molding drum 11 so as to assemble the inner liner member IL.

In assembling the carcass member P, after a plurality of cords reeled out of a reel stand 18*a* are aligned, the rubber is extruded from an extruder 18*b* and the cord is covered by rubber, the rubber strip with cord CGS formed at this stage is applied onto a transfer drum 18*c* and cut off thereon to a predetermined length according to the tire size to be handled, and after the predetermined number of cut-off narrow pieces are joined together to prepare a carcass member sheet for a single tire, the transfer drum 18*c* is moved to circumscribe the cylindrical molding drum 11, and these drums 11 and 18*c* are rotated in synchronization so as to transfer this sheet onto the molding drum 11 and to assemble the carcass member P.

For the tire size of the structure in which two layers of the carcass member P are assembled, after the carcass members in both layers for a single tire are aligned and prepared on the transfer drum 18*c* in the circumferential direction, the transfer drum 18*c* is brought into contact with the molding drum 11 corresponding to an assembling timing of each member and separated.

Also, for the inner-layer side belt member 1B, after a plurality of cords are reeled out of a reel stand 27*a* and aligned, the cord is covered by rubber by extruding the rubber from an extruder 27*b*, and the rubber strip with cord CGS formed at this stage is directly applied onto the molding drum 21, but since it is necessary to apply them along the cord in the direction inclined with respect to the tire axis, while the molding drum 21 is rotated, the applying device is moved in the axial direction of the molding drum 21 in synchronization and the narrow pieces are applied. The outer-layer side belt member 2B is similarly assembled.

Members other than the above-mentioned members assembled by the ribbon lamination method or the predetermined-width narrow-piece method are assembled as follows. The canvass chafer member CCH is assembled by reeling out a roll of a predetermined width formed in another process, cutting it to the length corresponding to a necessary circumferential length and winding it around the molding drum 11, but the axial directional position for winding is constituted variably. Also, the width of the canvas chafer member CCH is shared by as many sizes as possible in a range not causing a problem on tire performances.

With regard to the preset beads PB, they are prepared in a bead stock 19b for each size in advance and the preset beads PB in different sizes are taken up by a bead handing robot 19a according to the requested size so that many sizes are supported.

With regard to the spiral layer member SL, a roll of a narrow rubber with cord is set and this is reeled out and wound on the molding drum 21 in the spiral shape so as to assemble this member, but different sizes can be supported by changing the number of winding times at this time according to the size. The tires with different rim size are handled by changing the toroidal molding drum 21, but the second molding unit 5 is provided so as to exchange the drums within a predetermined tact time.

Also, the cylindrical drum 11 is constituted capable of supporting tire component members with different widths and diameters, while the toroidal molding drum 21 is constituted capable of optionally changing an interval between the right and left bead lock parts 21b and the core bodies 21a so that tire components members with different widths can be handled.

In other words, in the second molding unit 5, a rail portion of the endless track 23 corresponding to the working station F1 is provided capable of movement to a drum switching station D1 arranged outside this track, and this drum switching station D1 is constituted capable of turning the moved rail portion pivotally by a predetermined angle. In order to switch the size of the molding drum 21, first, at the working station F1, the molding carriage 22 on which the molding drum 21 to be ejected is fixed to the rail, and then, the rail portion with this molding carriage 22 mounted is moved to the drum switching station D1, this is turned pivotally, and a rail at an empty carriage storage X1 is connected to the moved rail portion so as to eject the molding drum 21 together with the molding carriage 22 to the carriage storage X1. And after that, the drum switching station D1 is further turned, the moved rail portion is connected to a rail of a carriage storage X2, and the molding carriage 22 with the molding drum 21 for a new size which has stood by at the carriage storage X2 is moved into the drum switching station D1. Then, after this is turned pivotally, it is returned together with the rail portion to the working station F1 so that the molding drum 21 can be switched in a short time.

Figure 11:
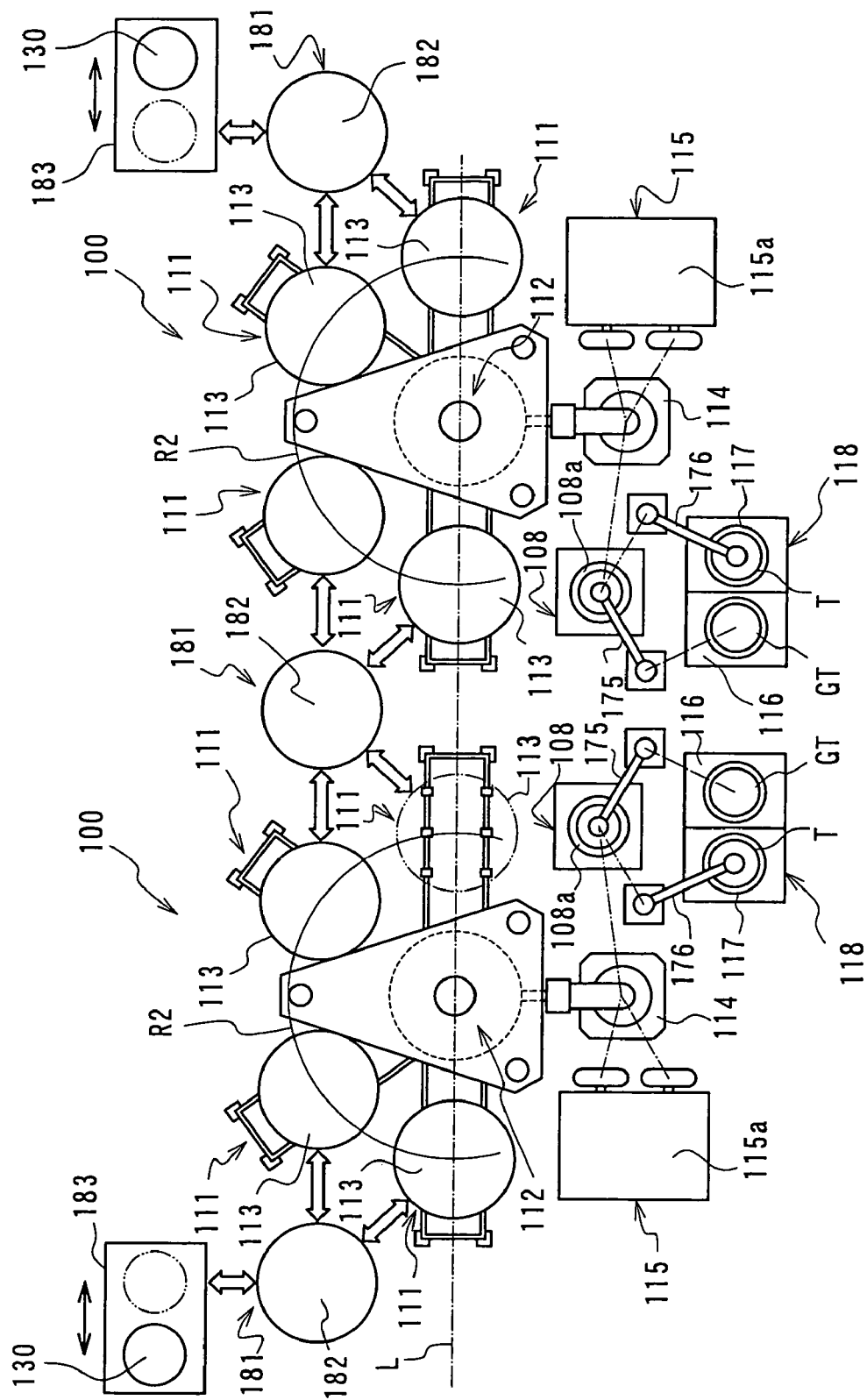
FIG. 11 is an arrangement plan of a tire vulcanization system.

Next, the tire vulcanization system 3 constituting the tire manufacturing system 1 will be described. FIG. 11 is a schematic plan view showing the tire vulcanization system 3 in which two similar vulcanization systems 100 are arranged adjacent to each other. In the following explanation, an "uncured tire" or a "tire which has not been cured yet" is synonymous with a green tire.

In each of the vulcanization systems 100, a single die opening/closing station 112 is arranged, and with the die opening/closing station 112 at the center, four vulcanization stations 111 are arranged on an arc R2 on one side of a straight line L connecting the centers of each of the die opening/closing stations 112 of the two vulcanization systems 100. And a die relay station 181 is provided at a position almost equidistant from each of at least two vulcanization stations 111 on the outside portion of the arc R2, and a die inserting/ejecting device 182 preferably in the turntable structure is provided so as to take out used vulcanization dies from each of the vulcanization stations 111 in the vicinity of this die relay station 181 and to insert a vulcanization die to be used next.

Also, at each of the vulcanization systems 100, four units of mobile vulcanization units 113 reciprocating between each of the four vulcanization stations 111 and the die opening/closing station 112 is provided. FIG. 11 shows a state where, among these four mobile vulcanization units 113, only the mobile vulcanization unit 113 corresponding to the rightmost vulcanization station 111 of the left vulcanization system 100 is displaced to the side of the die opening/closing station.

With respect to the straight line L connecting the centers of the die opening/closing stations 112, a tire transfer device 114 for the die opening/closing station for taking out a cured tire from the die opening/closing station 112 or for inserting an uncured tire into the die opening/closing station 112 is provided on the side opposite to the region where the vulcanization station 111 is arranged. At the die opening/closing station 112, a tire is housed in the die with the posture with its central axis perpendicular, and this tire transfer device 114 inserts/takes out the tire in this posture with respect to the die opening/closing station 112.

Also, within the operation range of this tire transfer device 114, a bladder attaching/detaching station 108 provided with a bladder attaching/detaching device 108a for attaching a bladder B to the uncured tire GT and detaching the bladder B from the cured tire T and a loading/unloading station 118 are provided, and at the loading/unloading station 118, an uncured tire stand 116 for temporarily storing the uncured tire GT before the bladder B is attached and delivering it to the tire transfer device 114 and a cured tire stand 117 for receiving the cured tire T from which the bladder has been removed from the tire transfer device 114 and temporarily storing it are arranged side by side. And between these stations 108 and 118, at least one but two units in FIG. of manipulators 175 and 176 for delivering the tire GT and T to each of the stations 108 and 118 are disposed.

The stands 116 and 117 arranged adjacent right and left on the same plane in this FIG. can be arranged adjacent vertically or fore and aft, and in either case, it is preferable that carrying-in of the uncured tire GT onto the stand 116 and carrying-out of the cured tire T from the stand 117 are performed using a conveying means such as a belt conveyer, not shown.

And also, it is preferable that, in addition to the above, a post-cure station 115 is provided within the operation range of the tire transfer device 114, and at this station 115, a post-cure inflator 115a is disposed for conducting PCI processing on the cured tire T including the bladder. The post-cure inflator 115a is constituted so that each tire is supported at four points to enable PCI processing for four tires at the same time and the tires are supported in the posture with their center axes horizontal. Also, at the bladder attaching/detaching station 108 and the uncured tire stand 116 as well as the cured tire stand 117, tires are fixed in the posture with their center axes vertical.

Figure 12:
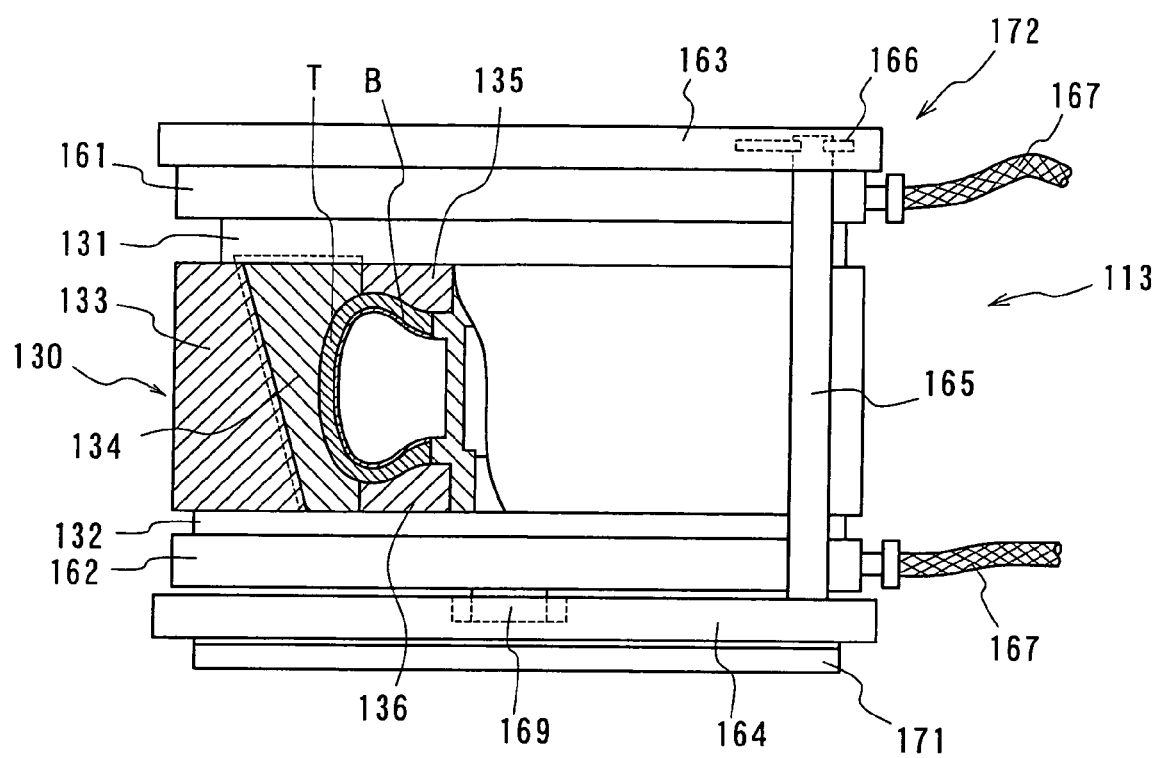
FIG. 12 is a side view showing a mobile vulcanization unit.

Each of the vulcanization stations 111, the die opening/closing station 112 and the mobile vulcanization unit 113 reciprocating between them constituting this vulcanization system 100 will be described. FIG. 12 is a side view showing the mobile vulcanization unit 113. This mobile vulcanization unit 113 is provided with a vulcanization mold 130 for storing the tire T and a bladder B for specifying the inner face shape of the tire T in a cavity.

The vulcanization mold 130 is provided with an upper mold 131, a lower mold 132 and a container 133, forming in combination the cavity for storing the tire T, and capable of separating them from each other in the vertical direction for loading/unloading the tire. And the lower mold 132 is provided with a lower side mold 136 corresponding to one of side portions of the tire, and the upper mold 131 is provided with an upper side mold 135 corresponding to the other side portion of the tire and a plurality of segment molds 134 combined in the circumferential direction in the annular shape, forming an outer-face shape of the tire tread portion and movable in the radial direction.

And the mobile vulcanization unit 113 has an upper platen 161 and a lower platen 162 which are brought into contact with both end faces of such vulcanization mold 130 to constitute a heating platen part, and a heat medium supply hose 167 is connected to each of the platens 161 and 162. According to this, through the hose 167, these platens 161 and 162 can be heated by supplying the heat medium, which is steam, for example, to a heat-medium jacket provided inside these platens 161 and 162, and this heat is transmitted to the vulcanization mold 130 to be brought into contact so as to cure the tire.

Moreover, the mobile vulcanization unit 113 is provided with an upper end plate 163 and a lower end plate 164 for integrally holding the vulcanization mold 130 and each of the platens 161 and 162 brought into contact with the both end faces between them, and has a plurality of tie rods 165 for connecting these end plates 163 and 164 to each other and a hydraulic jack 169 mounted on the lower end plate 164 for pressing the vulcanization mold 130 onto the upper end plate 163 to fasten the vulcanization mold 130. These end plates 163, 164, the tie rods 165 and the hydraulic jack 169 constitute a mold lock means for integrally fastening the vulcanization mold 130 and the upper and lower platens 161 and 162 in cooperation.

Also, the lower tip end of the tie rod 165 is fixed to the lower end plate 164 and the upper tip end of the tie rod 165 is engaged with the upper end plate 163 through the tie plate 166, and this tie plate 166 is constituted so that the tie rod 165 can be engaged with the upper end plate 163 or the engagement can be cancelled by rotating and displacing this tie plate 166 around the center of axis of the vulcanization mold.

Here, the upper mold 131, the upper platen 161, the upper end plate 163 and the tie plate 166 constitute an elevation unit part 172 which is moved integrally with the upper end plate 163 when it is hoisted up.

Figure 13:
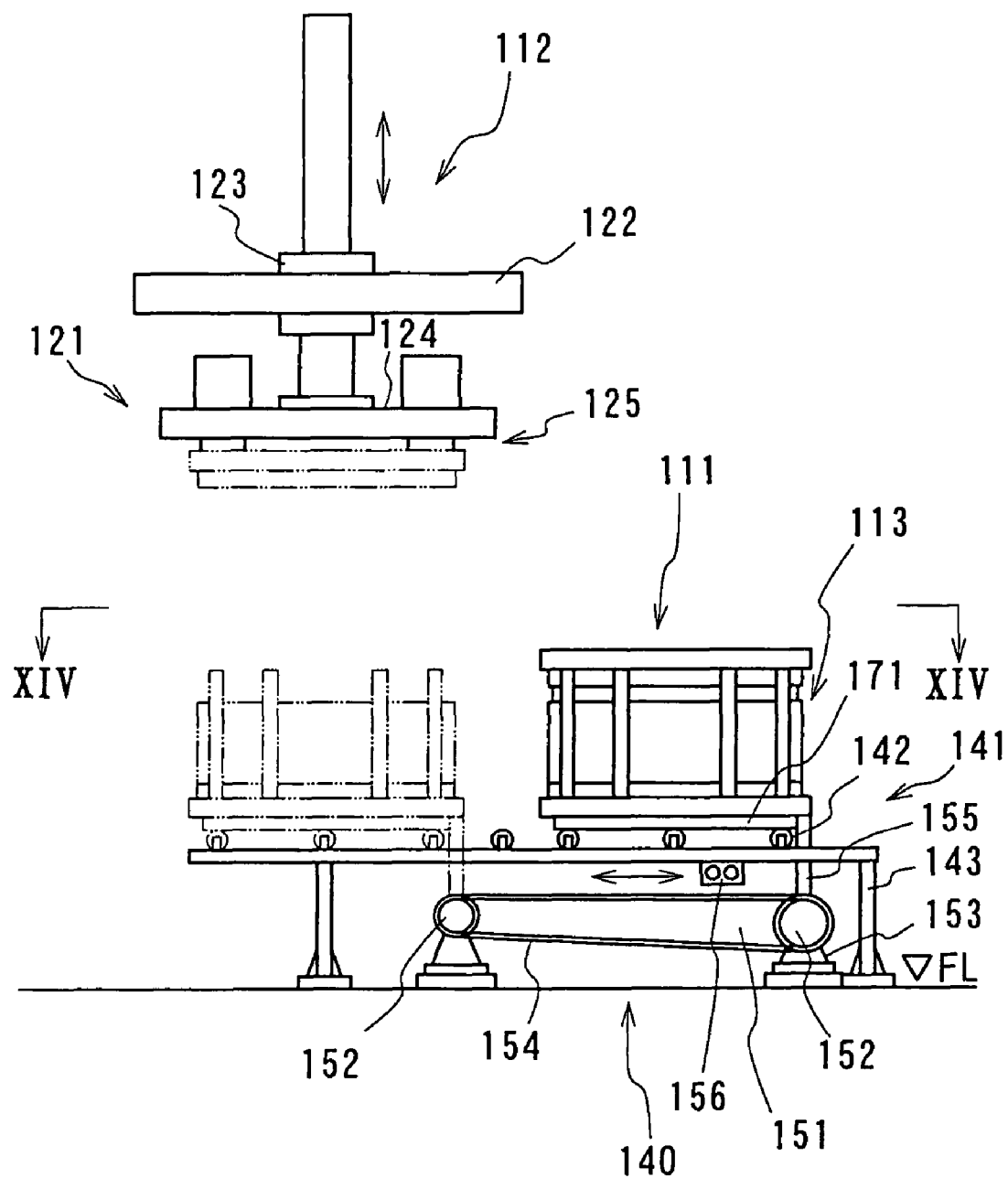
FIG. 13 is a front view showing a vulcanization station and a mold opening/closing station.
Figure 14:
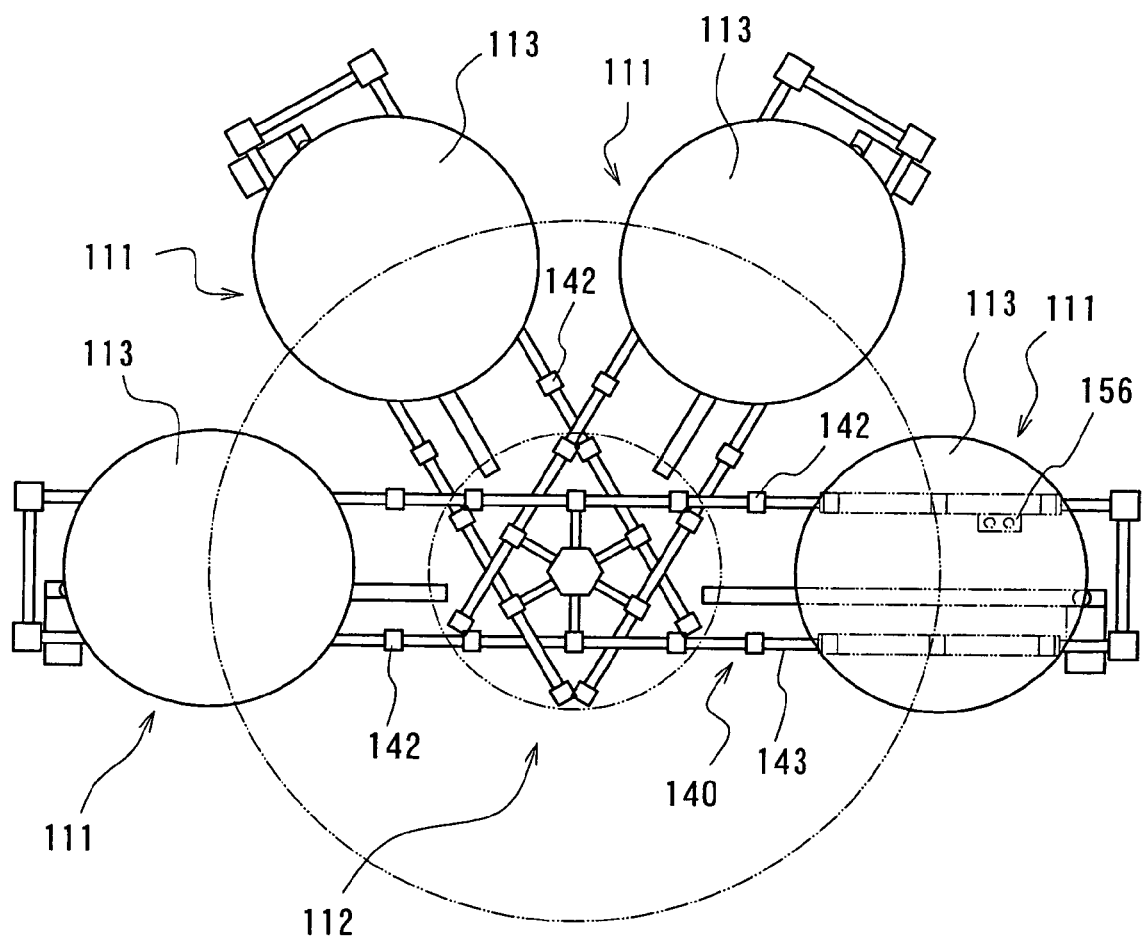
FIG. 14 is a plan view showing a vulcanization station and a mold opening/closing station.

Next, the vulcanization station 111 and the mold opening/closing station 112 will be described. FIG. 13 is a front view showing one of the mold opening/closing station 112 of the vulcanization system 100 in FIG. 11 and the vulcanization stations 111 provided opposite to it, and FIG. 14 is a plan view showing an arrow view of XIV-XIV in FIG. 13, but as for the vulcanization stations 111, all the four units arranged around the mold opening/closing station 112 are shown.

Each of the vulcanization stations 111 has a heat-medium supply port 156 for supplying the heat medium and is provided with a vulcanization unit reciprocatory driving device 140 for reciprocating and displacing the mobile vulcanization unit 113 between this vulcanization station 111 and the mold opening/closing station 112.

This vulcanization unit reciprocatory driving device 140 is comprised of a vulcanization unit driving part 151 and a vulcanization unit supporting guide part 141, and the vulcanization unit driving part 151 is provided with a driving bar 155 fixed to one link of a link chain 154 extended between two sprockets 152 and driven by a motor 153. The tip end of the driving bar 155 can be detachably connected by a connecting means, not shown, to the end part of the mobile vulcanization unit 113, that is, a portion located opposite to the mold opening/closing station 112, and by driving the motor 153 to reciprocate and displace the link chain 154, the mobile vulcanization unit 113 can be reciprocated and displaced.

The vulcanization unit supporting guide part 141 is provided with a plurality of rollers 142 and a roller mounts 143 for supporting them, and these rollers 142 are arranged in two rows between the corresponding vulcanization station 111 and the mold opening/closing station 112 in parallel with the straight light connecting them to each other. In the meantime, on the lower face of the mobile vulcanization unit 113, two guide rails 171 are mounted in parallel with this traveling direction, and by moving this guide rail 171 on the corresponding row of the rollers 142 along this row, the mobile vulcanization unit 113 can be reciprocated and displaced with respect to the mold opening/closing station 112.

As mentioned above, by constituting the vulcanization unit supporting guide part 141 of the vulcanization unit reciprocatory driving device 140 by the rollers 142 with short shafts laid on the movement section of the mobile vulcanization unit 113, as shown in FIG. 11, the extremely simple and low-cost tire vulcanization system 100 can be realized.

Moreover, as shown in FIG. 11, even at the mold opening/closing station 112 where the vulcanization unit reciprocatory driving device 140 provided on each of the vulcanization stations 111 crosses each other and its vicinity, the vulcanization unit supporting guide parts 141 or the vulcanization unit supporting guide part 141 and other mobile vulcanization units 113 do not interfere with each other when they are provided.

Also, in movement of the mobile vulcanization unit 113, since the vulcanization unit 113 can be moved with the heat-medium supply hose 167 for supplying the heat medium from the heat-medium supply port 156 connected to the upper and lower platens 161 and 162 of the mobile vulcanization unit 113, vulcanization can be continued even during movement of the mobile vulcanization unit 113, and by making use of this movement time as a part of the vulcanization time to the maximum, the cycle time can be reduced for that time, and moreover, equipment costs can be lowered and a risk of leakage of the heat medium from the connection part can be reduced.

The mold opening/closing station 112 is provided with a mold opening/closing device 121 at its center, as shown in FIG. 13, for elevating the elevation unit part 172 of the mobile vulcanization unit 113 which has been moved. This mold opening/closing device 121 is provided with a base 122 fixed through a column built from a floor face FL and a vertical unit 124 guided by a guide 123 mounted to this base 122 and elevated by a driving device, not shown. This vertical unit 124 is provided with an elevation unit part lock holding mechanism 125 for connecting or separating the upper end plate 163 and the tie rod 165 by rotating the above tie plate 166 of the mobile vulcanization unit 113 and for holding or releasing the holding of the upper end plate 163.

In this tire vulcanization system 3, after the uncured tire GT is received from the molding system 2 and cured in synchronization with the molding system 2, the cured tire T is ejected to an inspection system 6 for conducting inspection of the tire in synchronization with these systems 2 and 3. A series of operations from reception of the uncured tire GT to ejection of the cured tire T will be explained referring to the above FIG. 11.

The uncured tire GT conveyed from the previous process is loaded onto the uncured tire stand 116. After this uncured tire GT is transferred to the bladder attaching/detaching station 108 by the manipulator 175, the bladder B is attached inside the uncured tire GT at the bladder attaching/detaching station 108, and then, by the tire transfer device 114, the uncured tire GT with the bladder B attached is transferred to the mold opening/closing station 112. Since the mobile vulcanization unit 113 after the cured tire T had been removed has been standing by at the mold opening/closing station 112 with its vulcanization mold 130 open at this time, the uncured tire GT is set onto this vulcanization mold 130.

After the tire transfer device 114 is retreated from the mold opening/closing station, the mold opening/closing device 121 is lowered, the elevation unit part 172 of the mobile vulcanization unit 113 is lowered, and the elevation unit part lock holding mechanism 125 and the hydraulic jack 169 are operated so as to lock the elevation unit part 172 with the other portions of the mobile vulcanization unit 113.

After that, this mobile vulcanization unit 113 is moved to the vulcanization station 111 by the vulcanization unit reciprocatory driving device 140 so as to vulcanize the uncured tire GT stored in this at the vulcanization station 111. When the vulcanization is completed, the mobile vulcanization unit 113 is moved to the mold opening/closing station 112 by the vulcanization unit reciprocatory driving device 140, and the vulcanization mold 130 is released by the mold opening/closing device 121 of the mold opening/closing station 112 so that the cured tire T can be taken out thereof.

After that, this cured tire T is transferred to the post-cure station 115 from the mold opening/closing station 112 using the tire transfer device 114, and PCI processing is applied to this tire at the post-cure station 115. After the PCI processing is completed, the cured tire T is removed by the tire transfer device 114 again from the post-cure station 115 and transferred to the bladder attaching/detaching station 108.

At the bladder attaching/detaching station 108, the bladder is removed from the cured tire T to which the bladder has been attached, and this tire T is loaded on the cured tire stand 117 using the manipulator 176 and then, conveyed to the next process.

In the above-mentioned vulcanization system 3, a function to vulcanize tires, a function to open/close the vulcanization mold 130, and a function to attach/detach the bladder to/from the tire are provided in distribution to each of separate stations so as to improve operation rates of each function, but the vulcanization system 3 can be constituted by those having these functions altogether at the vulcanization station. Also, in this preferred embodiment, the vulcanization station is arranged on the arc with the mold opening/closing station at the center, but another arrangement such as vulcanization stations in the linear state, for example is allowed.

Figure 15:
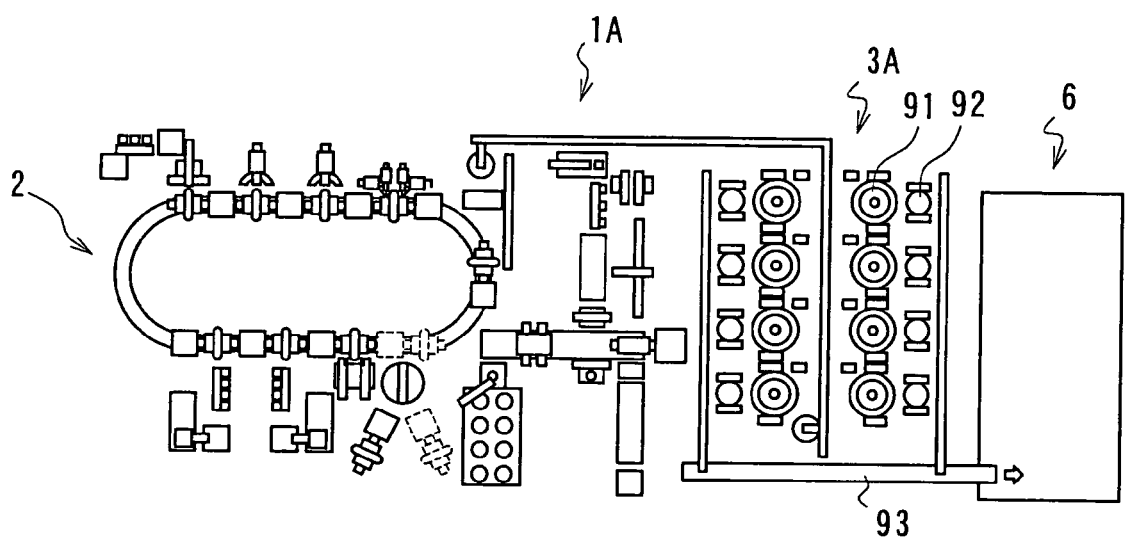
FIG. 15 is an arrangement plan showing a tire manufacturing system of another preferred embodiment.
Figure 16:
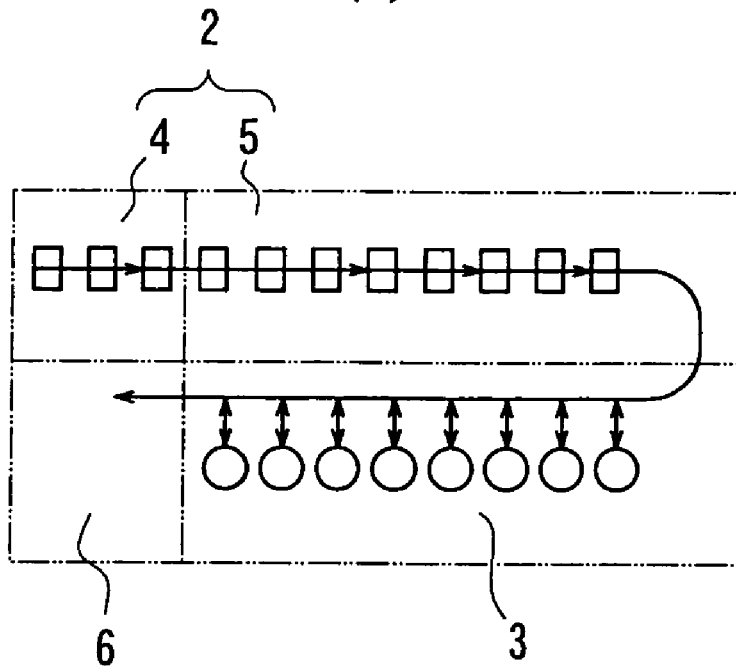
FIG. 16 is an arrangement plan showing another tire manufacturing system.
Figure 16:
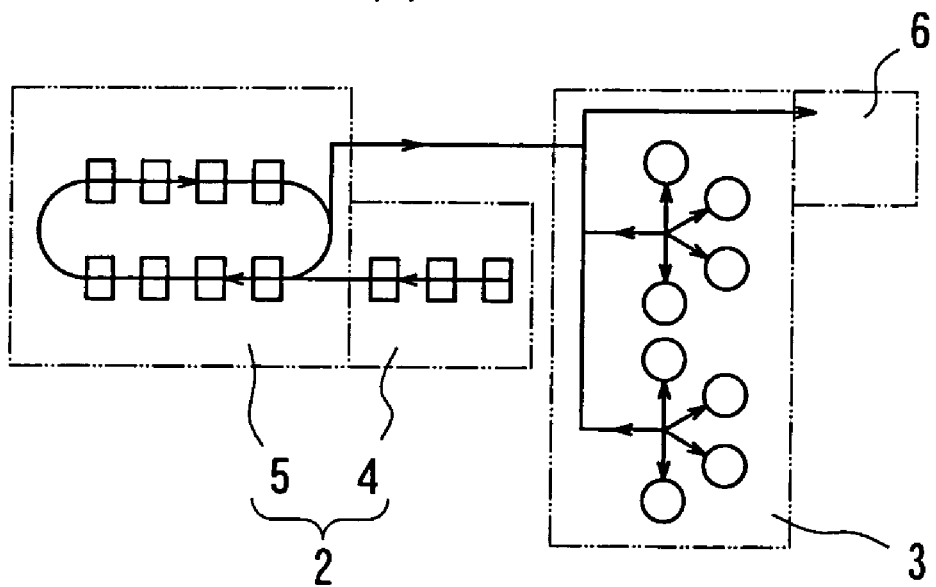
Figure 17:
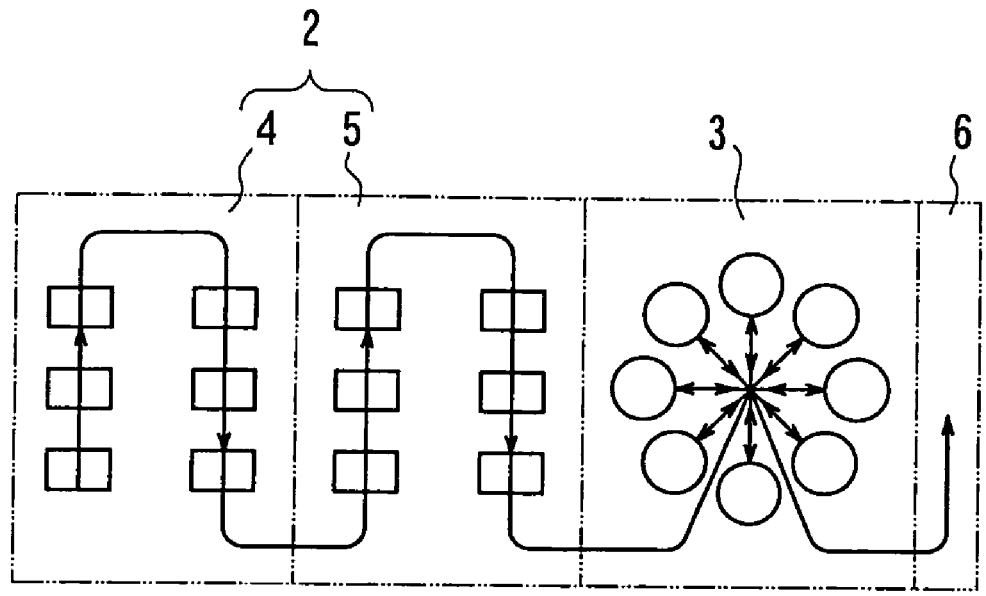
FIG. 17 is an arrangement plan showing another tire manufacturing system.
Figure 17:
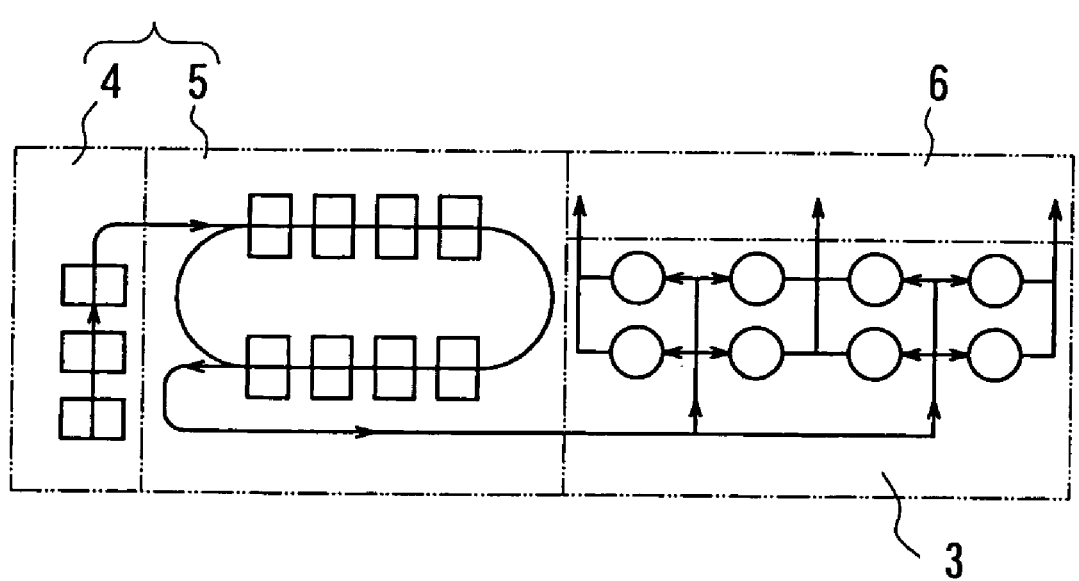
Figure 18:
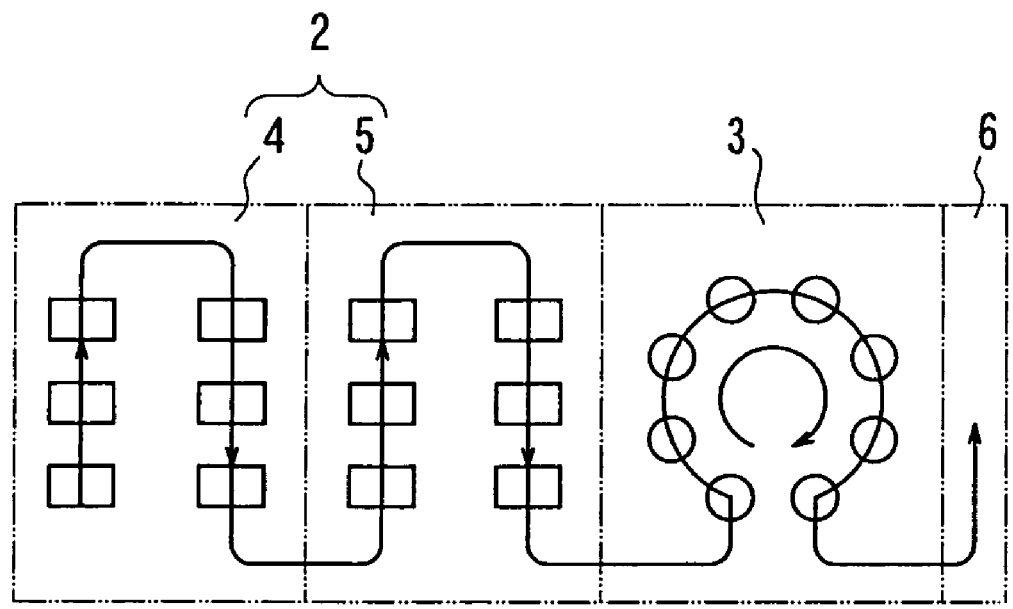
FIG. 18 is an arrangement plan showing another tire manufacturing system.
Figure 18:
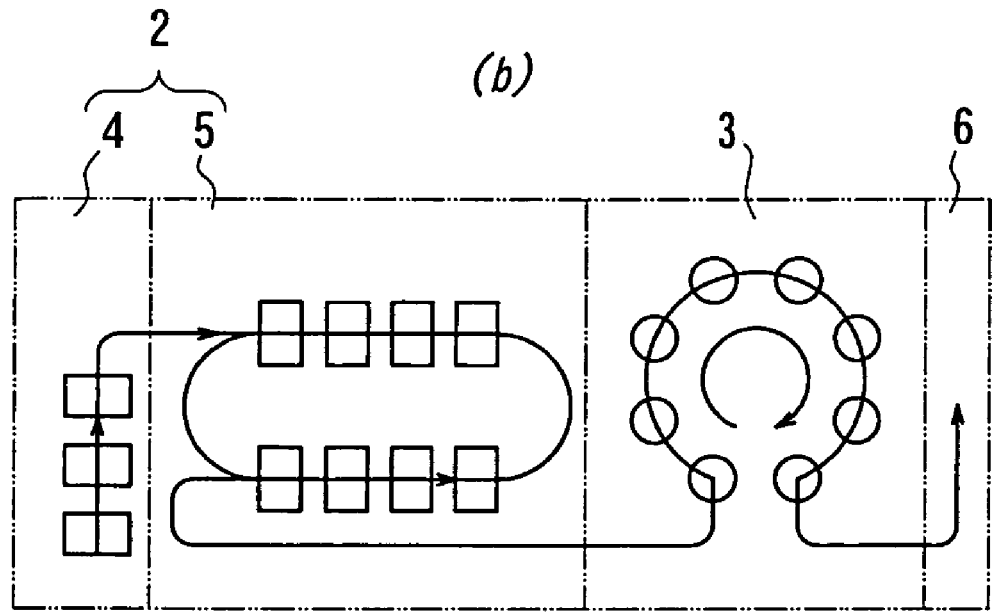

FIG. 15 is an arrangement plan showing a tire manufacturing system 1A of another preferred embodiment, and in this manufacturing system 1A, a vulcanization system 3A is different from the above-mentioned preferred embodiment. This vulcanization system 3A is provided with a plurality of vulcanization machines 91 linearly aligned in two rows and a water-cooling PCI 92 arranged corresponding to each of the vulcanization machines. And in vulcanizing tires with this system 3A, first, a green tire received form the molding system 2 is inputted to each of the vulcanization machines 91, where the green tire is attached to a bladder, and the vulcanization mold attached to the vulcanization machine 91 is closed to start vulcanization. After the vulcanization is completed, the mold is released for each of the vulcanization machines to take out the cured tire from the bladder and this is attached to the PCI 92 and then, they are conveyed to the inspection system by an ejection conveyer 93.

Moreover, the arrangement of the molding system, the vulcanization system and the inspection system in the tire manufacturing system according to the present invention can be made in many other ways in addition to the above, and the arrangement of the working stations and the vulcanization station in each of systems can be various. FIGS. 16(a), 16(b), 17(a), 17(b), 18(a) and 18(b) show those arrangement examples. In these FIGS., the working station for molding is indicated by a rectangle, a vulcanization station by a circle and the flow direction of the tire in the middle of manufacturing by an arrow. Also, the reference numerals of each system are common to all the arrangement examples, in which the molding system is 2, the vulcanization system is 3, the inspection system is 6, the first molding unit of the molding system is 4, and the second molding unit is 5. The arrangement shown in FIG. 16(b) corresponds to that shown in this preferred embodiment, and the vulcanization system shown in FIGS. 18(a) and (b) is constituted so that the vulcanization station itself is moved on the arc.

INDUSTRIAL APPLICABILITY

As obvious from the above, according to the present invention, since the carcass band is rolled up around the bead core by the toroidal molding drum capable of expansion/contraction in the toroidal shape, a tire in the conventional structure with high reliability can be formed. And since the green tire is removed from the toroidal molding drum at the end of the molding process, it is only necessary to heat the green tire in the next vulcanization process, whereby energy is not wastefully consumed. Also, since the green tire is molded based on the molding sequence predetermined in advance, including combination of green tires with different sizes in tandem chosen from the above group of sizes according to the need, tires with mixed plural sizes can be molded continuously.

The invention claimed is:

1. A tire manufacturing method for tires in plural sizes chosen from a group of sizes specified in advance, the method comprising:
   molding a green tire by assembling tire component members, of the green tire specified in advance, one by one in an assembling sequence specified in advance, wherein the members and the assembling sequence of the tire manufacturing method includes a combination of green tires in different sizes chosen from said group of sizes and the tire component members comprise a carcass band, two bead cores, a belt member and a tread member, the method further comprising:
   disposing the carcass band and the two bead cores on a molding drum which has a bead lock portion, the molding drum having a diameter that can be expanded or reduced in a toroidal shape,
   locking the bead cores with the bead lock portions,
   repeatedly moving the molding drum between-stations of a molding system having a plurality of working stations at a predetermined tact time, where the tact time is a sum of an actual working time and an idle time for each of the plurality of working stations, expanding the diameter of the molding drum, toroidally extending the carcass band between the bead cores, rolling up a side portion of the carcass band around the bead cores outward in a radial direction, assembling the belt member and the tread member with the bead cores locked to the molding drum and molding the green tire, reducing the diameter of the molding drum, unlocking the bead cores, and removing the green tire from the molding drum, determining a correlation of a circumferential phase and an amount of relative displacement or angular displacement between a center of axis of the carcass band and a center of axis of the bead core with a phase and an amplitude of a primary harmonic component of a radial run-out of the green tire;

measuring the radial run-out of a first green tire for one cycle and obtaining an inverted waveform in which the primary harmonic component is inverted;

calculating a circumferential phase and an amount of relative displacement or angular displacement between a center of axis of the carcass band and a center of axis of the bead core, which would cause the inverted waveform, by using the correlation determined in the previous step; and controllably setting a position or an angle of at least either one of the bead core axis centers by using the results of the calculating step in building of a subsequent green tire so as to cancel the primary harmonic component of the radial run-out and reduce the radial run-out of the subsequent green tire, wherein the foregoing steps are repeated to continuously mold green tires in mixed plural sizes.

* * * * *